US007953853B2

(12) United States Patent
Christensen et al.

(10) Patent No.: US 7,953,853 B2
(45) Date of Patent: May 31, 2011

(54) SYSTEM AND METHOD FOR PROVIDING ACCESS AND UTILIZATION OF CONTEXT INFORMATION

(75) Inventors: James Edward Christensen, Cortlandt Manor, NY (US); Peter K. Malkin, Arsdley, NY (US); Lewis Alexander Morrow, Wellesley, MA (US); John T. Richards, Chappaqua, NY (US); Rhonda Rosenbaum, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 2693 days.

(21) Appl. No.: 10/036,194

(22) Filed: Dec. 28, 2001

(65) Prior Publication Data

US 2003/0009566 A1  Jan. 9, 2003

Related U.S. Application Data

(60) Provisional application No. 60/303,945, filed on Jul. 9, 2001.

(51) Int. Cl.
  *G06F 15/173*  (2006.01)
  *G06F 15/16*  (2006.01)
(52) U.S. Cl. ............................ 709/225; 709/229; 726/32
(58) Field of Classification Search .................. 709/201, 709/203, 207, 223, 228, 229, 204, 206, 225; 707/10; 726/32
See application file for complete search history.

(56) References Cited

U.S. PATENT DOCUMENTS

| | | | |
|---|---|---|---|
| 5,493,692 A | 2/1996 | Thelmer | 455/26.1 |
| 6,192,394 B1* | 2/2001 | Gutfreund et al. | 709/204 |
| 6,304,892 B1* | 10/2001 | Bhoj et al. | 709/202 |
| 6,425,012 B1* | 7/2002 | Trovato et al. | 709/204 |
| 6,772,195 B1* | 8/2004 | Hatlelid et al. | 709/204 |
| 6,774,926 B1* | 8/2004 | Ellis et al. | 348/14.01 |
| 6,807,562 B1* | 10/2004 | Pennock et al. | 709/204 |
| 6,931,114 B1* | 8/2005 | Martin | 709/204 |
| 2002/0138286 A1* | 9/2002 | Engstrom | 705/1 |

OTHER PUBLICATIONS

Erickson, et al., "Socially Translucent Systems: Social Proxies, Persistent Conversation, and the Design of "Babble"", Human Factors in Computing Systems: The Proceedings of CHI 99. ACM Press, 1999.
"Next Generation Collaborative Services", http://www.bell-labs.com/org/11359/colab_serv/.

* cited by examiner

*Primary Examiner* — Peling A Shaw
(74) *Attorney, Agent, or Firm* — F. Chau & Associates, LLC

(57) ABSTRACT

A method provides for access to an electronic profile of a first client to a second client. The method comprises creating a network accessible electronic profile of the first client, wherein the electronic profile is accessible by an active object, wherein the active object is bound to the electronic profile. The method further comprises defining an access right of the second client, wherein the access right determines a portion of the electronic profile of available to the second client via the active object. The method verifies an identity of the second client, and provides access to the portion electronic profile to the second client via the active object, wherein the active object is transferable.

23 Claims, 24 Drawing Sheets

SYSTEM AND METHOD FOR PROVIDING ACCESS AND UTILIZATION OF CONTEXT INFORMATION

This application claims the benefit of U.S. Provisional Application No. 60/303,945 filed Jul. 9, 2001.

BACKGROUND OF THE INVENTION

1. Field of the Invention

The present invention relates to a system and method for controlled distribution of information.

2. Description of Related Art

Given an infrastructure for exchanging information between parties such as the Internet, no known method has replaced the traditional paper business card as a convenient and straightforward method of exchanging information between two or more parties. The paper business card is limited in terms of range of content, capacity, flexibility, currency, and control of information. Business cards typically include only printed information, and are small in dimension. If the information on a card changes, redistribution of an updated card can be difficult. Further, once a business card is issued, there may be no way to control the distribution of the information it contains to a third party. If a party has more than one capacity, it may be desirable to have a business card for each capacity. However, having different types of information for different parties can be inconvenient; furthermore, selection of the proper card can complicate the exchange of information.

Personal data assistants (PDA's) have introduced electronic business cards that can provide greater range of content. PDA's can convey marginally more information than the traditional paper business card and can include components such as images. However, the electronic business cards have limited capacity, flexibility, and currency, and control of information may not be possible. PDA business cards do not address the currency, redistribution, access and use issues of paper cards.

Therefore, a need exists for a portable indication of a client's information, providing status information and a method for requesting and enabling a response.

SUMMARY OF THE INVENTION

According to an embodiment of the present invention, a method provides access to an electronic profile of a first client to a second client. The method comprises creating a network accessible electronic profile of the first client, wherein the electronic profile is accessible by an active object, wherein the active object is bound to the electronic profile. The method further comprises defining an access right of the second client, wherein the access right determines a portion of the electronic profile available to the second client via the active object. The method verifies an identity of the second client, and provides access to the portion of the electronic profile to the second client via the active object, wherein the active object is transferable.

The method comprises defining a second access right of a third client wherein the access right determines a portion of the electronic profile available to the third client via the active object.

The active object is an network accessible active object. The electronic profile comprises location information of the first client. The electronic profile comprises status information of the first client. The electronic profile comprises a communication channel of the first client.

Defining the access right further comprises defining the access right according to a predefined access right specifying a portion of the electronic profile accessible to the second client.

The electronic profile is associated with one or more clients.

The method comprises limiting the portion of the electronic profile provided by the active object according to a preference of the second client.

The active object enables the second client to contact the first client.

The method comprises specifying, in the electronic profile, a communication channel of the first client accessible to the second client, and establishing the communication channel between the first client and the second client upon selecting the communication channel, wherein the active object comprises means for selecting the communication channel.

The electronic profile notifies the first client upon an access of the electronic profile.

At least one of the first client and the second client is a role satisfied by one or more users.

The method comprises specifying means for transacting funds. The means for transacting funds is specified in the electronic profile. The method comprises charging a fee for transacting funds between the first client and the second client. The means for transacting funds dynamically determines one of a source and a destination of funds of the first client according to a property of the transaction.

The method comprises authenticated the electronic profile. The method further comprises authenticating information disclosed by the electronic profile.

The method comprises automatically modifying the access right of the second client according to a variable defined in the electronic profile. The access right changes over time as a function of a relationship between the first party and the second party.

The method further comprises storing a contract template, wherein the contract template comprises a plurality of roles and a plurality of access rights, wherein each role is associated with at least on access right, staffing each role with one of the first client and the second client, wherein the first client and the second client each provide access to corresponding electronic profiles accessible by corresponding active objects, and assigning access rights to the first client and second client according to the contract template and the active objects.

A program storage device is provided readable by machine, tangibly embodying a program of instructions executable by the machine to perform method steps for providing access to an electronic profile of a first client to a second client. The method comprises creating a network accessible electronic profile of the first client, wherein the electronic profile is accessible by an active object, wherein the active object is bound to the electronic profile. The method further comprises defining an access right of the second client, wherein the access right determines a portion of the electronic profile available to the second client via the active object. The method verifies an identity of the second client, and provides access to the portion of the electronic profile to the second client via the active object, wherein the active object is transferable.

According to another embodiment of the present invention, a system is provided enabling a first client to provide access to an electronic profile of the first client to a second client. The system comprises a database connected to a network for storing the electronic profile, wherein the electronic profile of the first client accessible by an active object, a network interface for accessing the database. The system further comprises an access right handler module for verifying an identity of the second client, wherein the electronic profile is associated with the identity of the second client, an awareness handler module for responding to information requests from the active object, and a communications handler module for establishing a communications channel between the first client and the second client in response to a request from the active object.

The system comprises a chat handler module for establishing a private Internet communications channel.

The system further comprises a display, and a renderer for rendering the active object on the display.

The active object is a web browser. The active object is managed according to at least one attribute of the electronic profile. The active object can be rendered in one of an address book, a to-do list, an e-mail active object, and a calendar. The address book comprises at least one sent active object and at least one received active object.

At least one of the first client and the second client is a role satisfied by one or more users.

According to an embodiment of the present invention, a method is provided for opening a communications channel between at least two clients. The method comprises specifying, at a database storing an electronic profile, a communication channel accessible to a second client, wherein the database in connected to a network. The method further comprises polling the electronic profile for the communication channel accessible to the second client, and providing an indication of a specified communication channel to the second client. The method comprises selecting means for establishing the communication channel accessible to the second client, and establishing the communication channel between the first client and the second client.

The electronic profile is accessible to the second client via a network accessible active object using a synchronous communication means. The electronic profile is accessible to the second client via a network accessible active object using an asynchronous means.

Access to the electronic profile is made available to the second client by giving the second client a network address corresponding to the electronic profile.

The method comprises providing a representation of the communication channel, wherein the representation includes an indication of whether the channel is available. The representation of the communications channel includes an indication of a preferred channel.

The method comprises monitoring a status of the communication channel, and establishing the communication channel upon determining that a resource related to the communication channel is available.

At least one of the first client and the second client is a role satisfied by one or more users.

According to an embodiment of the present invention, a method is provided for determining a client for a position of employment comprising providing a description of the position to a staffing agent, and determining staffing for the position according to an eCard of the client, wherein the client provides access to a calendar to the staffing agent. The method further comprises notifying the client of an acceptance for the position, and monitoring the position for changes in staffing.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1A:
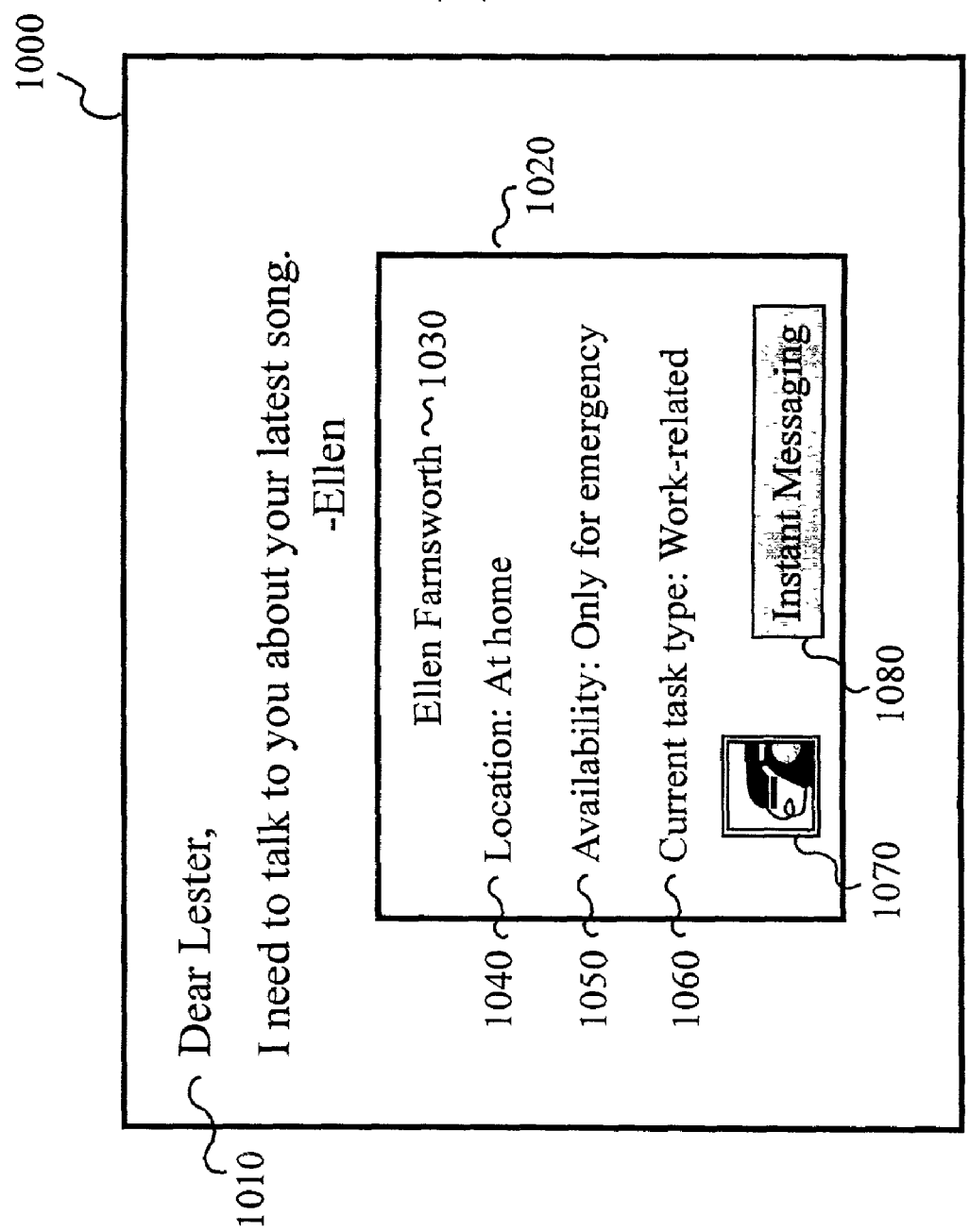
FIG. 1a is an illustrative example of an eCard embedded within a network communication according to an embodiment of the present invention.

The present invention provides a system and method for a dynamically updated electronic profile of a client. The electronic profile comprises information about the client and can be updated periodically. The electronic profile can be accessed by an active object. The active object is an eCard, where the eCard is a rendering of a portion of the client's electronic profile comprising information. The information communicated by an eCard can include, for example, representations of the client's position, and means which the client has designated as a channel of communication. The information that can be accessed through the eCard can be limited according to, for example, client preferences and predefined disclosure profiles.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The information comprising the electronic profile of the client accessed by the eCard. The information can include, for example, representations of the current state of a first client, an issuing client, and means for a second client, a viewing client, to contact the first client. The electronic profile can be stored on a network accessible server. The information can be automatically updated, for example, determining the client's position every half hour. According to an embodiment of the present invention, the eCard is implemented as a Java applet. The eCard accesses the information of electronic profile through a network connection, for example, a TCP/IP connection. A client can represent a plurality of users with a shared electronic profile, for example, an investment club or a corporation.

Referring to FIG. 1a, a note 1000 to the second client includes text 1010, and an embedded active graphic object, an eCard 1020. The graphic 1020 can include, for example, a header 1030 specifying a name of the issuing client, and status identifiers 1040, 1050 and 1060. The issuing client can control the attributes of the eCard, for example, the types of status identifiers. Status identifiers can indicate, for example, the location of the issuing client, a current state of availability, and a current task type.

Icons can be implemented to enable tasks. For example, a telephone icon 1070 places a telephone call to the issuing client, and an Instant Messaging (IM) icon 1080 establishes a IM session between the issuing client and the viewing client. An icon can represent a particular component, for example, the issuing client's office telephone, or a dynamic means of placing a call to the issuing client. For example, determining which of the issuing client's telephones to place a call to, or bind, depending on the issuing client's location. A dynamically selected telephone may not be bound by the telephone icon 1070 until a viewing client selects the icon.

Embodied as an applet, the eCard can be included and displayed within any application that is able to render HTML, including for example, Lotus Notes® e-mail and Microsoft® Outlook®. For applications without a rendering capability, e.g., IM, the eCard can be attached as a Uniform Resource Locator (URL). The URL, when selected, can open a web browser in which the eCard can be rendered. Thus, the eCard can be platform independent: a given eCard can be viewed from any machine that can render HTML.

Figure 1B:
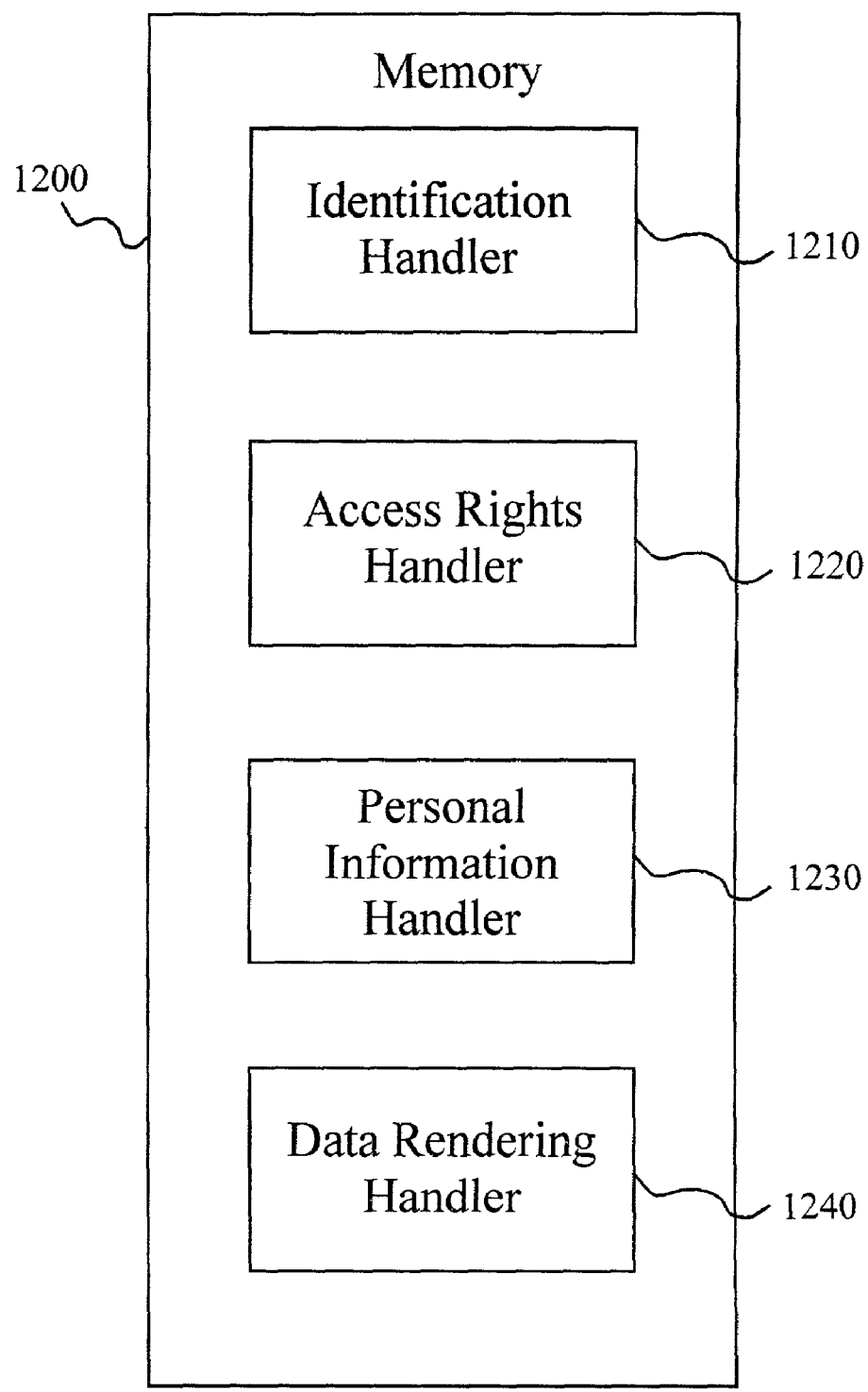
FIG. 1b is a diagram of a eCard according to an embodiment of the present invention.

FIG. 1b is a diagram of an eCard according to an embodiment of the present invention. As shown, the eCard application 1200 can include, an Identification Handler 1210, an Access Rights Handler 1220, a Personal Information Handler 1230, and a Date Rendering Handler 1240. The Identification Handler 1210 can determine a user identification (ID) of a client attempting to view the eCard. The Identification Handler 1210 can prompt the viewing client for a user ID and a password, and confirm that the ID/password pair is valid by referencing, for example, a Central Access Rights Handler of an eCard Server, 3070, FIG. 3. The Access Rights Handler 1220 can determine which data the viewing client can access. The Access Rights Handler 1220 can request a list of disclosed data from the Central Access Rights Handler 3070. Given a list of data resources, the Personal Information Handler 1230 can retrieve relevant data from an eCard Awareness Handler 3040, FIG. 3. The Personal Information Handler 1230 can obtain the data by pushes and/or pulls from the eCard Awareness Handler 3040. Given the data, the Data Rendering Handler 1240 can provide tangible representations of the data. These representations can include, for example, graphics and audio.

Figure 1C:
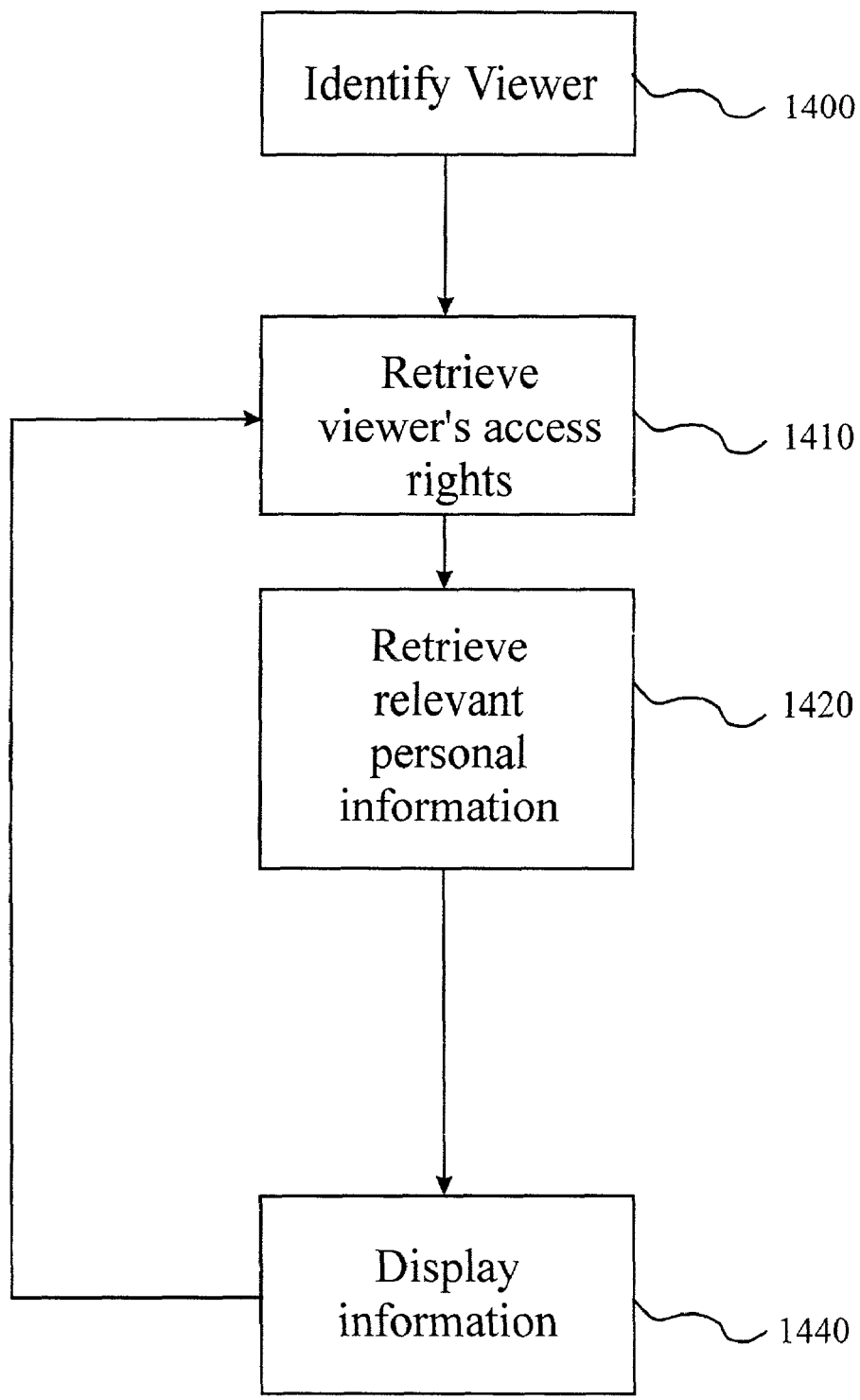
FIG. 1c is a flow chart of a method for providing access to information according to an embodiment of the present invention.

Referring to FIG. 1c, when invoked, an eCard, through the Identification Handler, 1210 FIG. 1b, identifies a client attempting to view the eCard in block 1400. In block 1410, the eCard invokes the Access Rights Handler, 1220 FIG. 1b, which retrieves the disclosure access rights, if any, corresponding to the viewing client. In block 1420, the eCard invokes the Personal Information Handler, 1230 FIG. 1b, to retrieve data for the eCard. In block 1440, the eCard invokes the Data Rendering Handler, 1240 FIG. 1b, to render the current data. Control continues at block 1410.

According to an embodiment of the present invention, status identifiers can specify a level of granularity. For example, the location identifier 1040 can specify "At home." This neither specifies where "home" is, nor the particular location, e.g., a room in the home. Thus, even though the first client gives the second client access to the first client's location, the first client can limit the extent to which information is revealed. The location icon 1040 can, for example, be limited to the indications "at work" or "not at work."

The configuration and information displayed by the eCard can change in response to particular client data. For example, the first client described by the eCard 1020 leaves home and drives to work, this information can be determined, e.g., by tracking cellular communications of the first client. Thus, the location 1040 can change, for example, from "At home" to "In transit." Given the location information, the eCard may not render the instant messaging icon 1080, since there may be no way for the first client to interact with this service while in transit; the telephone icon 1076 can be shown if the first client has access to a cell phone.

One with regular skill in the art will appreciate that an eCard can be authenticated by a viewer. For example, the eCard itself and the information that the eCard discloses can be authenticated using a digital signature. The digital signature can be created with, for example, the MD5 Message Digest Algorithm (Rivest, R., "The MD5 Message Digest Algorithm," RFC1321, MIT and RSA Data Security Inc., April 1992). Such a digital signature can be computed using the data from the eCard, including the eCard's application code, and the data it displays. Thus, such a digital signature can be used to authenticate both the eCard and the rendered data.

Figure 2A:
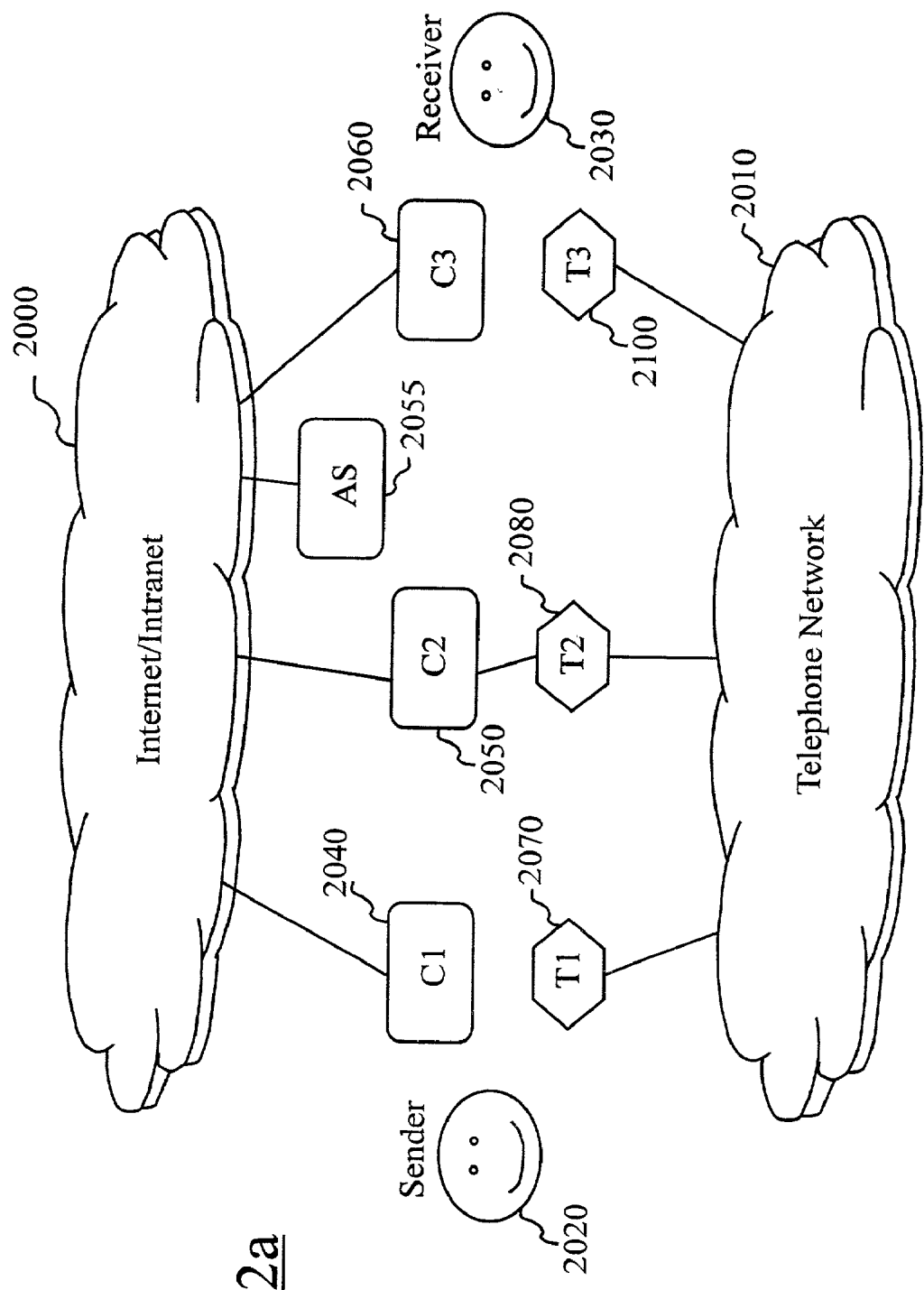
FIG. 2a is a diagram of a network according to an embodiment of the present invention.

FIG. 2a depicts an overview of a logical network. The network can include a digital network 2000, a telephone network 2010, a Sender 2020, a Receiver 2030, network nodes C1 2040, C2 2050 and C3 2060, and telephones T1 2070, T2 2050 and T3 2100. The network can include an Application Server 2055.

Network nodes C1 2040, C2 2050, and C3 2060 can be, for example, personal computers (PCs), like an IBM ThinkPad®. Network nodes C1 2040 and C3 2060 can be, for example, a network connected personal data assistant (PDA), or smart cellular telephone. Telephones T1 2070 and T3 2100 can include, for example, a wire-based telephone or cellular telephone. The T2 2080 is connected to C2 2050 via, for example, a serial communications link.

Figure 2B:
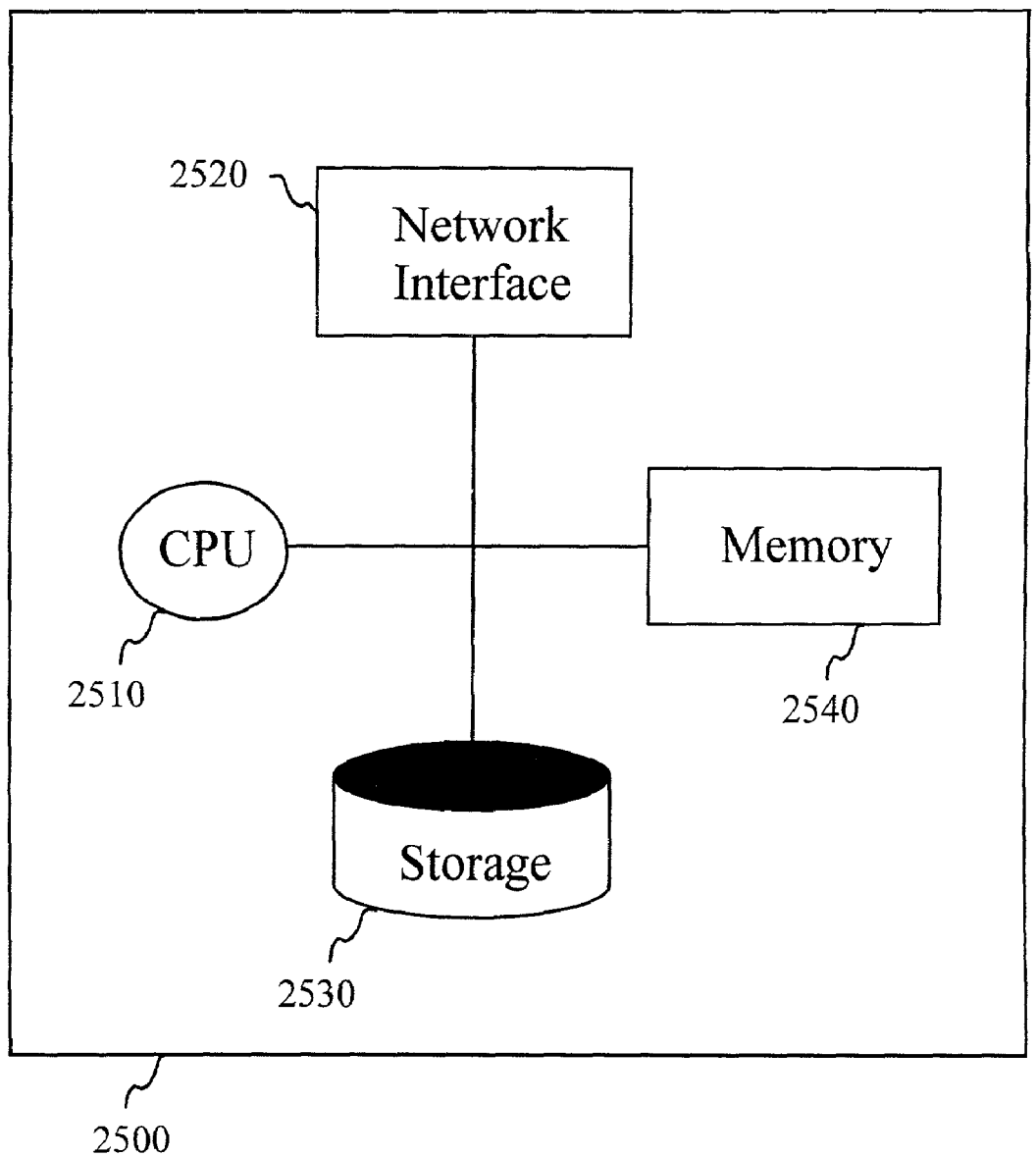
FIG. 2b is a diagram of a client node according to an embodiment of the present invention.

FIG. 2b depicts a client network node, as used by the Sender's node 2040 and the Receiver's node 2060. The network node 2500 can include a central processing unit (CPU) 2510; a network interface 2520; storage 2530, such as programmable nonvolatile RAM or DASD; and memory 2540, such as RAM. According to the present invention, program logic, for example, embodied as computer executable code, can be loaded from storage 2530 into memory 2540 for execution by CPU 2510. The executable code can be, for example, Java or C++.

Figure 3:
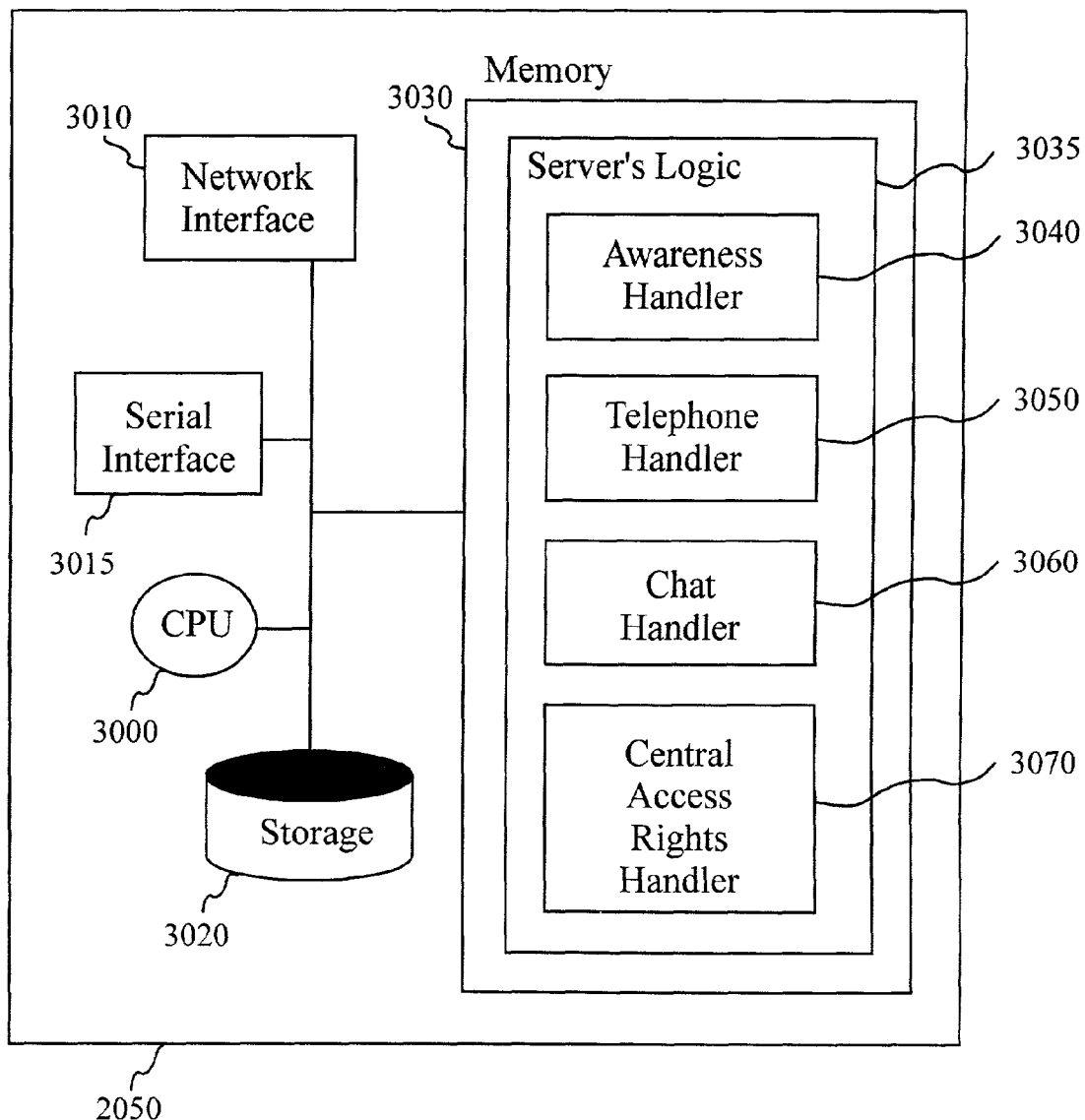
FIG. 3 is a diagram of an eCard Server according to an embodiment of the present invention.

Referring to FIG. 3, a Server network node 2050 can include a CPU 3000; a network interface 3010; and a serial interface 3015. The Server network node further comprises storage 3020, such as programmable nonvolatile RAM or DASD, storing, for example, a client's electronic profile; and memory 3030, such as RAM. The memory 3030 preferably includes a Server's Logic 3035, an Awareness Handler 3040, a Telephone Handler 3050, a Chat Handler 3060, and a Central Access Rights Handler 3070. Server Logic 3035 can be embodied as, for example, computer executable code, loaded from storage 3020 into memory 3030 for execution by the CPU 3000.

Figure 4:
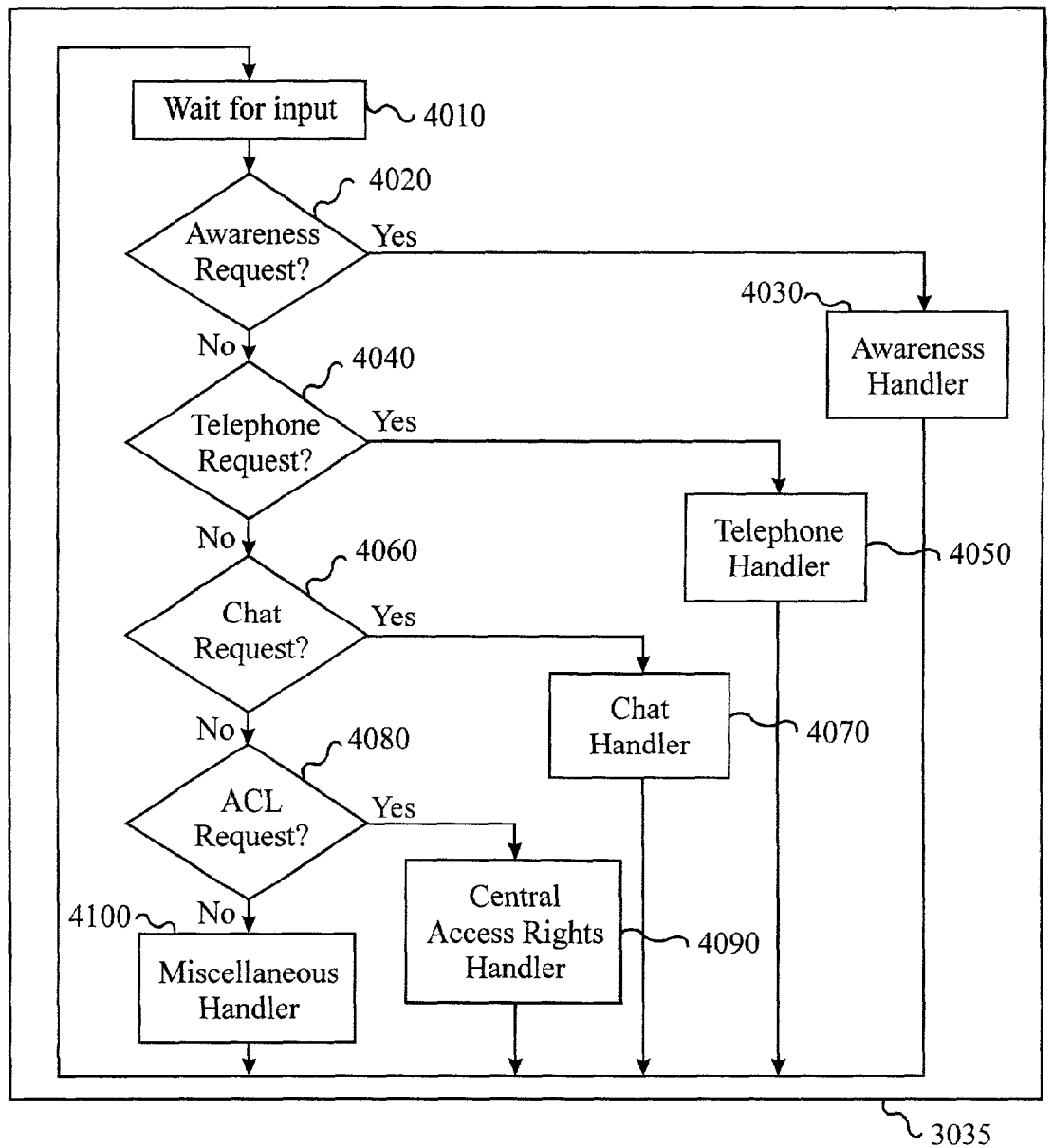
FIG. 4 is a flow chart of an eCard Server's logic according to an embodiment of the present invention.

FIG. 4 is a flow chart of a the Server's Logic 3035. In block 4010, the program waits for input. The input is checked in block 4020, and if it is an awareness request, an eCard's request for a client's information, the Awareness Handler 3040 is invoked in block 4030. Control continues at block 4010. If the input is not an awareness request, the input is checked in block 4040, and if it is a telephone related request, the Telephone Handler 3050 is invoked in block 4050. Control continues at block 4010. If the input is not a telephone request, then the input is again checked in block 4060, and if it is a chat related request, the Chat Handler 3060 is invoked in block 4070. Control continues at block 4010. If the input is not a chat request, the input is again checked in block 4080, and if it is an access control related request, the Central Access Rights Hander 3070 is invoked in block 4090. Control continues at block 4010. Other handlers can be implemented within the logic. For example, a miscellaneous handler can be invoked in block 4100. Control continues at block 4010.

The Awareness Handler 3040 can respond to a request from an eCard upon a client's electronic profile, which comprises status information and/or a pointer to status information, for example, stored on a second awareness handler. Such status information can include a location, a level of availability, an idle time, and a type of task the user is involved in. The Awareness Handler 3040 can obtain this information from another awareness server, e.g., a server reporting an access point of the client's PDA is currently using, or a server reporting whether the client is currently using their telephone, or from a client's computer indicating a current application and idle time. The Awareness Handler 3040 can also provide higher level, more abstract types of information by combining other forms of information, e.g., determining the client's level of general availability by monitoring whether the client is on the phone and whether the client is actively using a computer.

The Telephone Handler 3050 can handle requests from eCard communication icons to establish telephone calls, and for the state of a given phone. The Telephone Handler 3050 can provide services via telephone T2 2080 to which it has access through the serial interface 3015. The services include, for example: calling another number and reporting whether or not it is busy; and calling two separate telephone numbers and conferencing them together—thus, establishing a private call between to the two numbers called.

The Chat Handler 3060 can handle requests related to chat conversations. Such requests establish a private online conversation between a sender and a receiver, as well as requests for the state of a given chat, e.g., whether the sender, is currently participating in a particular chat topic/community/topic.

The Central Access Rights Handler 3070 can handle requests for disclosure rights. This information can include a user ID and password pair for any and all users whose access rights are set. Thus, whenever a client specifies their user ID and password to a given eCard so as to view it, the eCard verifies the specified pair with the Central Access Rights Handler 3070.

The Central Access Rights Handler 3070 maintains access information for each client. Maintenance can include the addition, deletion and modification of client data. Thus, to enable the second client to view an eCard of the first client, the first client adds the second client to the database. For example, the first client can provide a user ID, password, and/or digital signature for accessing the eCard, and access information limiting what the second client can access. Further, whenever a client wants to view an eCard, the eCard retrieves the client's access rights from the Central Access Rights Handler 3070.

The first client can also specify a set of disclosures that are provided to clients without a valid ID, a default disclosure configuration. Thus, enabling the first client to provide eCard access to others they have never met. Thus, a client can access the first client's eCard even though the client is not registered with the Central Access Rights Handler 3070. The Central Access Rights Handler 3070 can be implemented using a database, such as IBM's DB2® database product.

The handlers, for example, the Awareness Handler 3040, and the Central Access Rights Handler 3070 can operate on a separate network node. For example, wherein each server runs on a different node.

Figure 5:
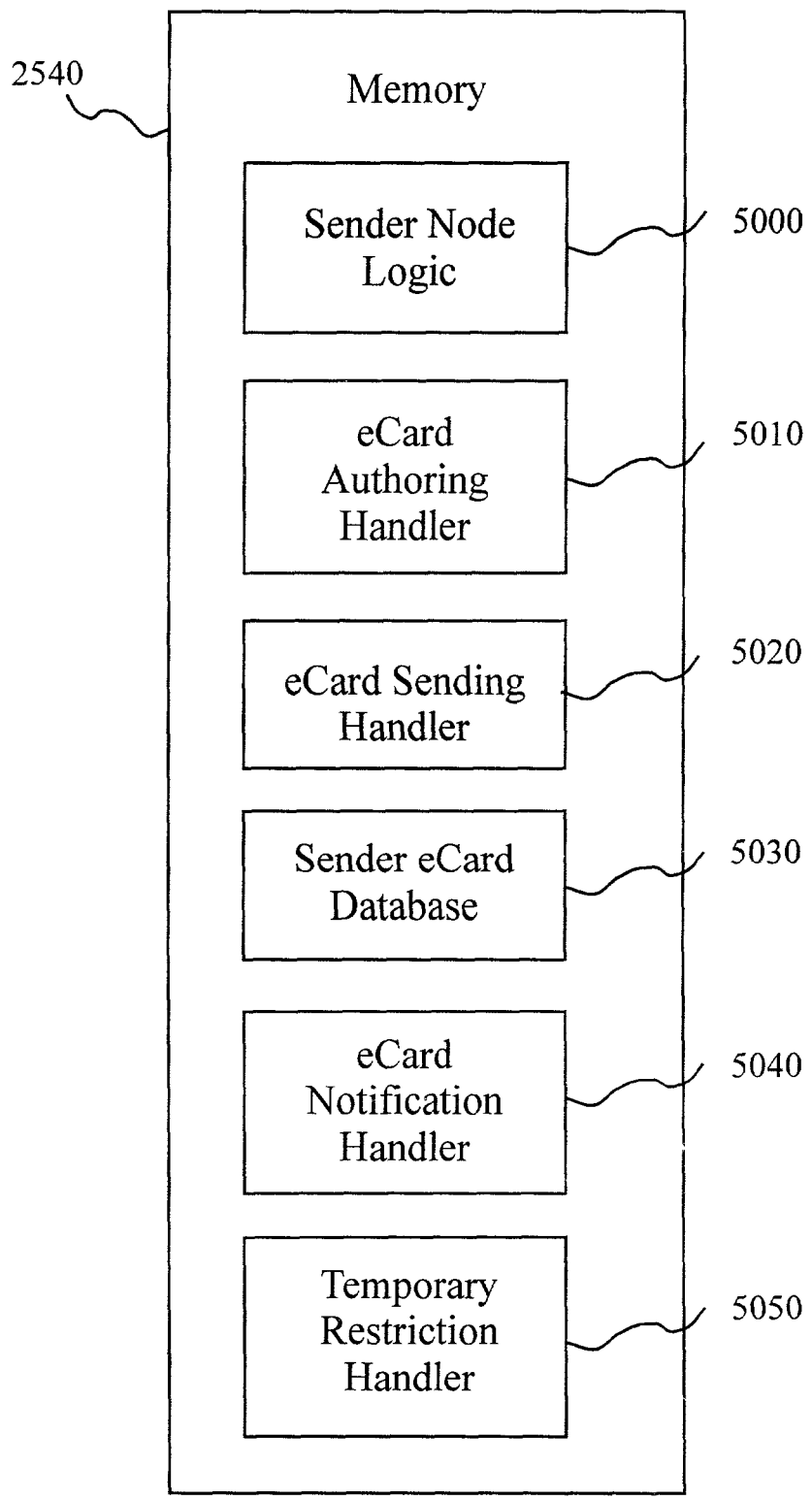
FIG. 5 is a diagram of a Sender node's memory according to an embodiment of the present invention.

FIG. 5 is a diagram of C1 2040, and in particular the Sender node's memory 2540. The memory 2540 can include a Sender Node Logic 5000, an eCard Authoring Handler 5010, an eCard Sending Handler 5020, a Sender eCard database 5030, e.g., IBM's DB2® database product, an eCard Notification Handler 5040, and a Temporary Restriction Handler 5050.

Figure 6A:
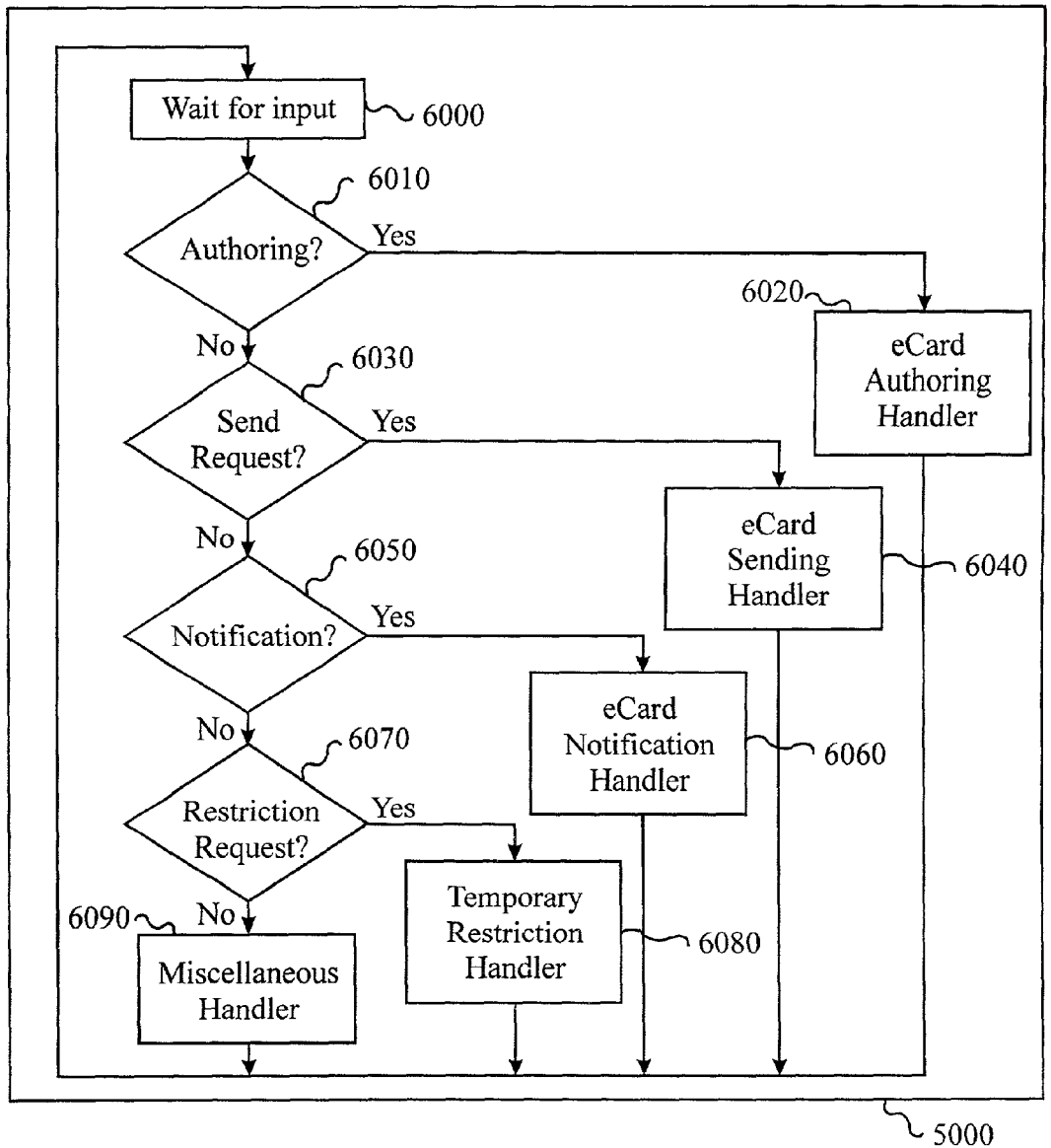
FIG. 6a is a flow chart of a Sender Node's logic according to an embodiment of the present invention.

FIG. 6a is a block diagram of the program logic and flow of the Sender Node's Logic 5000. In block 6000, the program waits for input. The input is checked in block 6010, and if it is a request to author a new eCard, the eCard Authoring Handler 5010 is invoked in block 6020. Control continues at block 6000. If the input is not a request to author a new eCard, the input is checked in block 6030. If the input is a request to send an eCard, the eCard Sending Handler 5020 is invoked in block 6040. Control continues at block 6000. If the request is not a request to send an eCard, the input is again checked in block 6050. If the input is an eCard notification, the eCard Notification Handler 5040 is invoked in block 6060. Control continues at block 6000. If the input is not an eCard notification, the input is checked in block 6070. If the input is a request to temporarily restrict disclosure, the Temporary Restriction Handler 5050 is invoked in block 6080. Control continues at block 6000. A miscellaneous handler can be invoked in block 6090. Control continues at block 6000.

The eCard Authoring Handler 5010 allows the first client to provide access to their eCard to the second client. This is accomplished by specifying the user ID of the second client. The eCard Authoring Handler 5010, contacts the Central Access Rights Handler 4090 to verify that the given user ID is already registered with it. If not, the first client can be prompted for a password that is passed to and stored by the Central Access Rights Handler 3070. The first client can specify the information to be disclosed to the second client. This data can be stored both on the Sender Card Database 5030 and passed for storage to the Central Access Rights Handler 3070.

One with regular skill in the art will appreciate that in addition to allowing the first client to specify different sets of disclosures for each new viewing client, the eCard Authoring Handler 5010 can also provide the first client with a choice of predefined configurations. For example, the choice can include a predefined configuration for coworkers that provides access to the first party's business-relevant information, e.g., their work phone and IM communication channels. Another predefined configuration can be for family and friends that provides disclosure of the first party's non work-related information, e.g., the home telephone and fax channels.

The eCard Sending Handler 5020 enables the sender 2020 to transmit an eCard to a receiver 2030. This can include creating a note—e.g., an explanation of the why the sender 2020 wants the receiver 2030 to contact them, including the eCard within the note, and sending the compound object to the receiver 2030. This handler 5020 can include, for example, the Lotus Notes® and Microsoft® Outlook® e-mail client products.

The eCard Notification Handler 5040 manages notifications sent by previously transmitted eCards. Such notifications can include an indication that an eCard has been read or deleted by the receiver, or that the receiver has passed the given eCard to another client. The eCard Notification Handler 5040 uses the Sender eCard Database 5030, storing the received notifications for future use.

The Temporary Restriction Handler 5050 enables the first client to temporarily block the disclosure or use of portions of their electronic profile information. For example, while involved in an important discussion, the first client can block access to his or her telephone, or even to block all access to prevent an interruption. The restrictions specified to this handler 5050 are passed and stored as special entries on the Central Access Rights Handler 3070. These entries allow the Central Access Rights Handler 3070 to temporarily deny access to one or more bits of information without permanently changing any of the given user's other disclosure configurations.

For example, given two clients, a second client X has access to the first party's telephone, and a third client Y without access to the first client's telephone, the Temporary Restriction Handler 5090 can block access to the first party's phone while he or she attends a top level meeting. If either client X or Y now attempts to contact the first client via an eCard telephone channel, they will find it disabled. If the first client uses the Temporary Restriction Handler 5050 to re-enable the telephone channel, client X will now again have access to the telephone channel, while client Y will not.

Figure 6B:
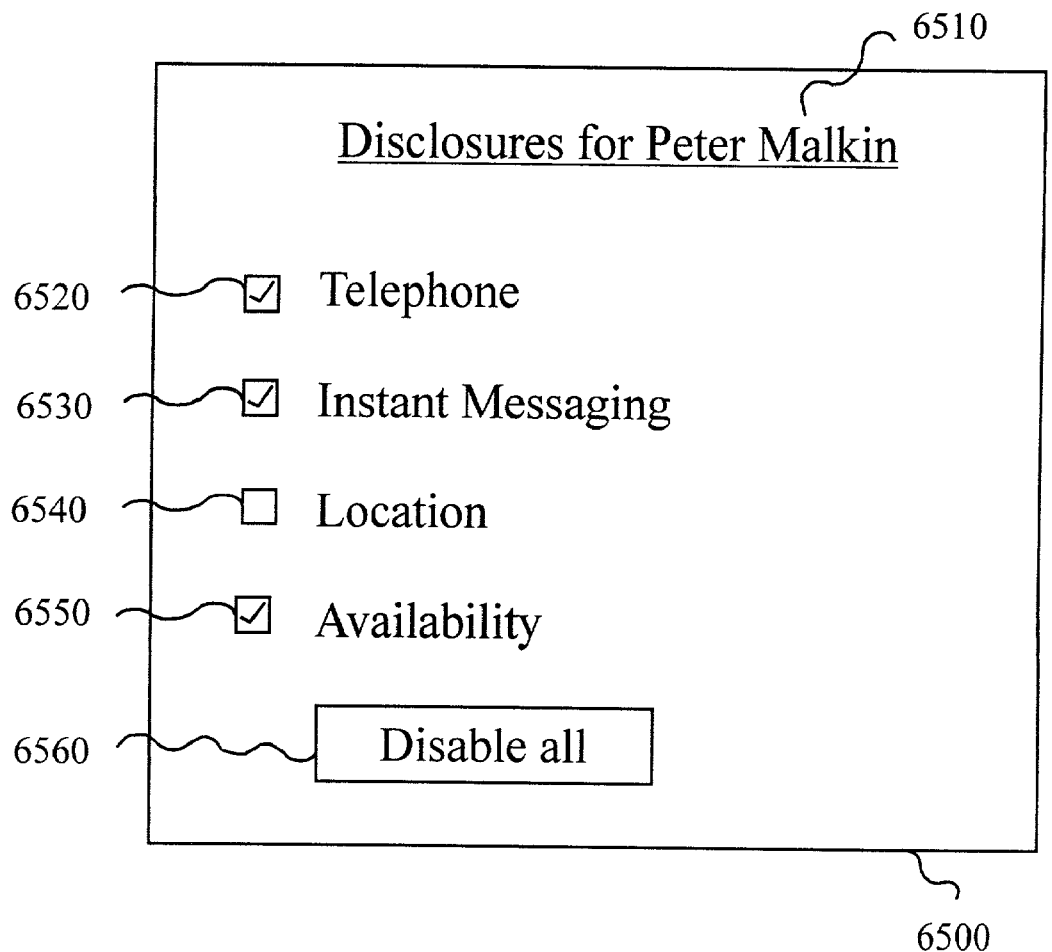
FIG. 6b is an illustrative example of a Temporary Restriction Handler User Interface according to an embodiment of the present invention.

FIG. 6b depicts an example of a user interface 6500 for the Temporary Restriction Handler 5050. The interface 6500 can include a title 6510 indicating whose access right are being shown, buttons with labels for several bits of personal information, including the telephone channel 6520, the IM channel 6530, Location 6540, and Availability 6550. The interface 6500 also provides means for disabling access 6560 which, when selected, disables all of the second client's access rights. As shown, the first client has enabled all but their Location information.

Figure 7:
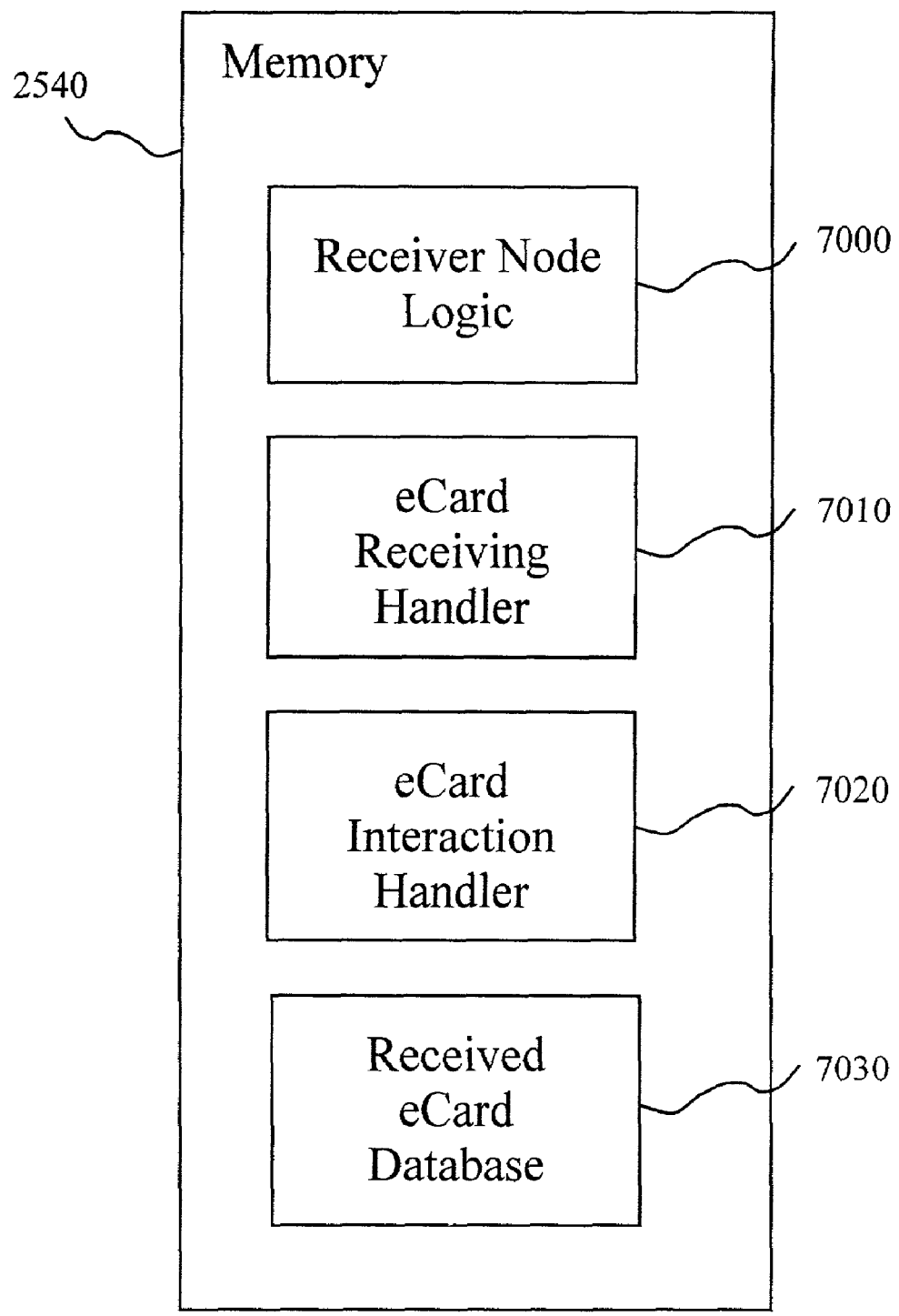
FIG. 7 is a diagram of a Receiver node's memory according to an embodiment of the present invention.

FIG. 7 is diagram of C3 2060, the Receiver's node's memory 2540. The memory 2540 includes a Receiver Node Logic 7000, an eCard Receiving Handler 7010, and an eCard Interaction Handler 7020, and the Received eCard Database 7030 (e.g., IBM's DB2® database product).

Figure 8:
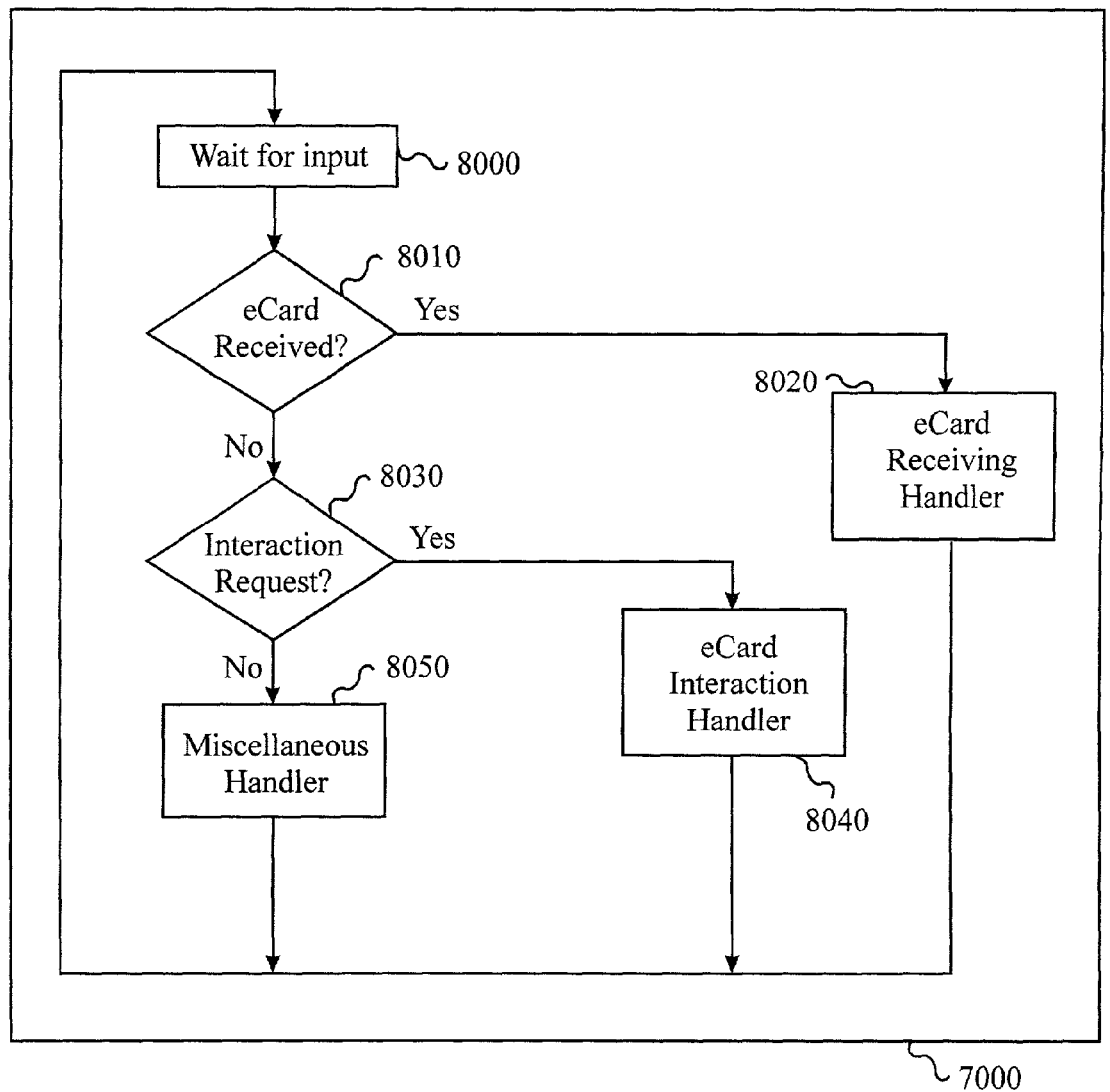
FIG. 8 is a flow chart of a Receiver node's logic according to an embodiment of the present invention.

FIG. 8 flow chart of the Receiver Node Logic 7000. In block 8000, the program waits for input. The input is checked in block 8010, and if it is the receipt of a new eCard, then the eCard Receiving Handler 7010 is invoked in block 8020, following which control continues at block 8000. If not the input is again checked in block 8030, and if it is a request to interact with an eCard, then the eCard Interaction Handler 7020 is invoked in block 8040, following which control continues at block 8000. A miscellaneous handler can be invoked in block 8050 for additional tasks, following which control continues at block 8000.

The eCard Receiving Handler 7010 enables the receiver 2030 to obtain eCards sent to them. The eCard Receiver Handler 7010 can be, for example, a MIME-compliant application, for example, Lotus Notes®. Such applications can enable the recipient to detach MIME attachments and store them elsewhere, for example, one the viewing client's PC. Thus, the receiver 2030 can detach an eCard, and store it in, for example, the Received eCard Database 7030. The detached eCard can be passed from the receiver to the third client. The access rights of the receiver may not be inherited by the third client. The access rights of each client are defined by the issuing client represented by the eCard.

The eCard Interaction Handler 7020 allows the receiver 2030 to use an eCard (e.g., 1020) they have received. This includes: viewing the eCard so as to see the sender's dynamically updated status, selecting a communication channel the sender 2020 has included in the eCard, attempting to delegate the eCard to another client, or submitting the eCard to a local process that provides additional filters to the eCard data. E.g., if the receiver 2030 wishes to contact the sender 2020 via telephone, and yet the sender 2020 has included both telephone 1070 and chat 1080 channels in their eCard 1020, the receiver 2030 can add a filter to the eCard 1020. The filter can remove the chat channel 1080 from the rendered interface. Additionally, the eCard can be bundled with additional information. For example, the eCard for a stock broker can be bundled with dynamically updated stock prices, where the stock is selected by the receiver of the eCard.

One with regular skill in the art will appreciate that the first client can include a communications icon in their eCard labeled "pager device," the corresponding device implicitly enabling the second client to send the first a short text note. The communications icon can be connected to various communications facilities, e.g., e-mail, or chat. Thus, for example, the first client can link a "pager device" icon to an e-mail account, in the hopes that the second client would follow pager-message-convention and keep their response short.

By sending a communications icon, rather than an actual address, the first client can maintain additional privacy. For example, the first client can send the second client a one-time-only eCard including a telephone communications icon. Thus, the second client can contact the first client via the eCard once. The telephone icon need not be bound to a single number. The telephone to call can be determined when the call is made. For example, if a second client selects a first client's telephone icon during regular work hours, can be connected to the first client's telephone in their work office. In contrast, if the second client selects the same telephone icon while the first party is on a business trip, they can be connected to the first party's cell phone.

The first client can include an icon in their eCard through which a second client can be paid, e.g., for services or objects rendered. The first client can change the method of payment (e.g., from their VISA to their American Express card) without the second client becoming involved. The first client can also suspend the second party's use of the payment icon. The first client can also allow the second to see how much they (the first client) are able to spend. Further, the first client can provide an application that directs charges placed via the payment icon to different sources of funds depending on the charge type (e.g., work-related), size (e.g., greater that $1000), quality (e.g., payment needs to be received within 3 hours, or within 3 months), and requester (e.g., baby sitter, or stock broker).

For example, the first client can provide their broker, the second client, with a payment icon that indicates how much the first client is willing to invest. Thus, the broker can check the first party's payment icon, determine if sufficient funds are available for a trade, and make an investment for the first client.

One skilled in the art will also appreciate that a given eCard communications icon can be a reference to another eCard. Thus, the Chief Executive Officer (CEO) of a major corporation can include a "Technical" communications icon in their eCard that referenced the eCard of the corporation's Chief Technical Officer (CTO). Whenever a receiving client selected this icon, they would be given the version of the CTO's eCard using the rights the CEO had given the receiving client where the rights of the CEO are superior to the rights of the CTO as applied to the CTO's eCard.

eCard Camp-On Agent

In addition to being used directly by users, eCards can be used by automatic processes to perform tasks needing coordination between two or more clients (e.g., users), this coordination involving the personal information of the relevant clients (e.g., their location or availability).

An example is an eCard Camp-on agent that enables a first client to have synchronous communication established between them and a second client whenever the two clients— and their communications channels—are both available. A preferred embodiment of this invention will be described in which the first client uses the eCard Camp-On Agent to establish a telephone communication with the second client.

Figure 13:
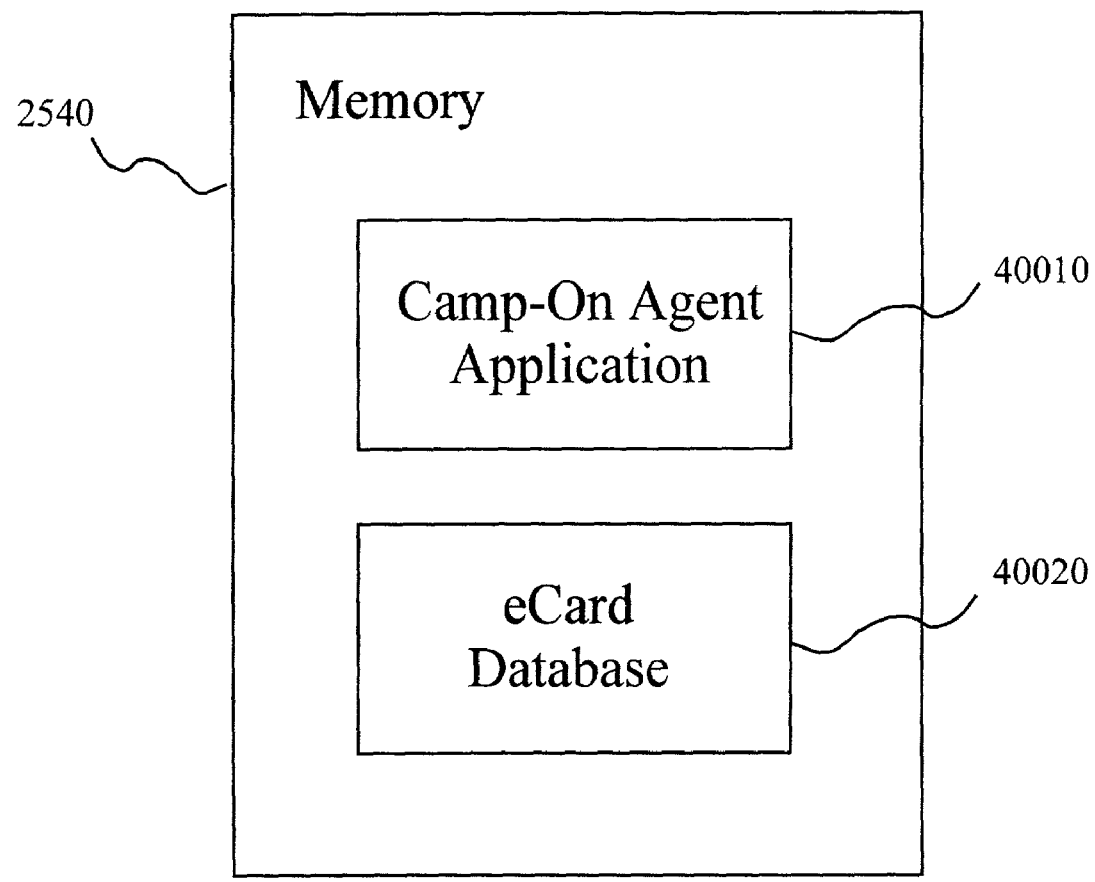
FIG. 13 is a diagram of a memory of a Camp-on Agent according to an embodiment of the present invention.

The eCard Camp-On Agent application can be run by the first client from a network node (e.g., 2040 or 2060), comprising, for example, the internal hardware components described with reference to FIG. 2b. FIG. 13 depicts the memory 2540 of this node. As shown, the memory 2540 includes the Camp-On Agent Application 40010, FIG. 14, and the eCard Database 40020.

The eCard Camp-On Agent application 40010, can be an application (e.g., one written in Java or C) enabling the first client to request the establishment of a communication between themselves and a second client whenever the client and their communication channels are available. The eCard Camp-On agent allows the first client to select from any of the users whose eCards are stored (or referenced) in the eCard database 40020.

The eCard database 40020 can provide access to all the eCards the current client has sent and received. The eCard database 40020 can be a front end interface that accesses both the first client's Sender eCard database 5030 and Received eCard database 7030. The eCard database 40020 can also be the user's single eCard database in the case where the Sender eCard database 5030 and the Received eCard database 7030 are the same database.

Figure 14:
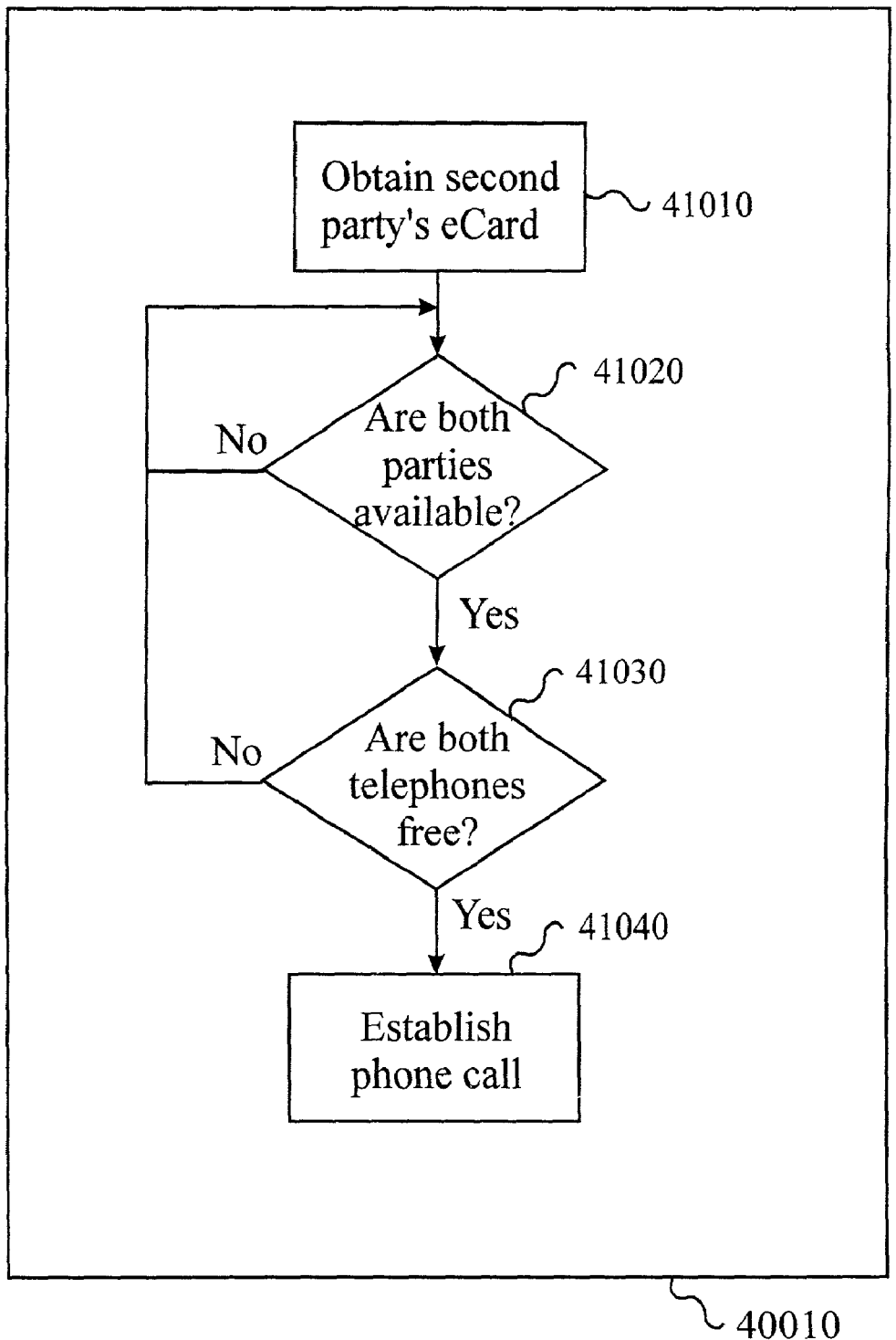
FIG. 14 is a flow chart of a Camp-on Agent Application according to an embodiment of the present invention.

As shown in FIG. 14, the eCard Camp-On Agent application 40010 begins in block 41010 by obtaining the eCard of the second client. This can be accomplished by having the first client specify the name of the second client to the application 40010, and then having the application retrieve the eCard from the eCard database 40020. This can also be accomplished by a rendering of the second party's eCard dragged and dropped onto the eCard Camp-On agent application's user interface. Note that the application 40010 can already have access to the first party's eCard by virtue of running the application (e.g., the first party's eCard being an application installation argument).

Next, in block 41020, the application 40010 checks to see whether both the first and second clients are free, accomplishing this by checking the "Availability" data 1050 from both parties' eCards. If not, then control continues at block 41020. If both clients are available, then in block 41030, the application 40010 checks to see whether both telephones are free, accomplishing this by checking the telephone communications channel 1070 on both parties' eCards. If not, the control continues at block 41020. If both phones are free, the application establishes the phone call using the second party's telephone communication channel 1070.

The eCard Camp-On Agent can monitor one or more communication channels between the first and second client, and connect the two clients together using a first available common channel. For example, if client X asks an eCard Camp-On Agent to talk with client Y, and X and Y have telephones and IM communications, then the eCard Camp-On Agent will connect the two clients together using either the telephones or IM's, whichever becomes available first.

The first client can specify a communications channel priority list to the eCard Camp-On Agent. Thus, the agent will establish the first available common communications channel of high priority to connect the two clients.

The second client can be comprised of two or more clients. Thus, the first client can employ an eCard Camp-On Agent to establish a communication between the first client and four other coworkers. The Camp-on Agent monitors the state of all five relevant eCards, the first client and those of the four coworkers.

The Camp-on agent application 40010 can also be given a date and time by which the call needs to be placed. The application 40010 can check at block 41020 to see if this date and time have already passed, and, if so, send a failure notice to the invoking client, following which the application 40010 would exit.

eCard PIM Apps

According to an embodiment of the present invention, a client can manage one or more eCards using an address book. Given a collection of eCards, the eCard address book can provide means for storing, accessing and cross-referencing one or more eCards. The address book can provide an alphabetically indexed list of eCards that a given client has sent out and that they have received from others. Each entry of the eCard address book can be keyed with a name (e.g., a person or organization's name) and comprises either or both the eCard from the given client (the "from" eCard), as well as the eCard provided for that client (the "to" eCard). Thus, a given entry can show what the associated client has disclosed and what has been disclosed to the client.

Figure 9:
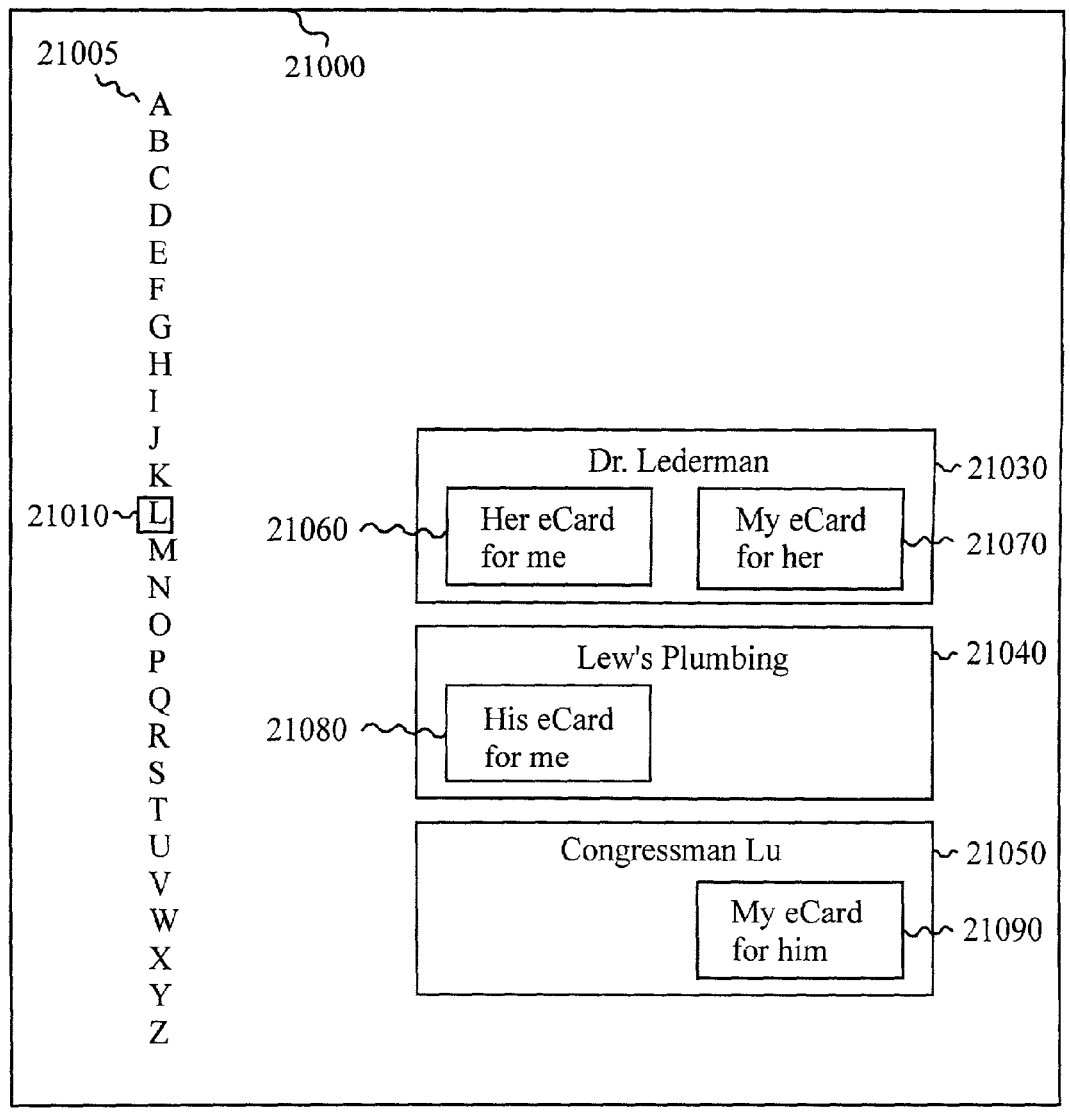
FIG. 9 is an illustrative example of eCard address book according to an embodiment of the present invention.

FIG. 9 depicts an example of an eCard Address Book user interface 21000. The user interface can include a list of the letters of the alphabet, A-Z 21005. The letter "L" 21010 is shown as being selected. To the right, are "L" entries in the address book. Each entry can include associated "from" cards, e.g., 21060 and 21080, and "to" cards, e.g., 21070 and 21090. As shown, Dr. Lederman's entry 21030 comprises Dr. Lederman's "from" eCard on the left 21060, with my eCard for Dr. Lederman on the right 21070. Entry 21040 shows the case where Lew's plumbing has provided the receiving client with an eCard 21080, but no eCard has been provided to Lew's. Entry 21050 shows an issued eCard 21090, but no received eCard.

By positioning the "from" and "to" eCards next to each other in each given entry, the address book viewer gets an indication of both what the given client is disclosing to them, and what they are disclosing to the given client. This provides an indication of the type of relationship and current level of intimacy between the clients.

If I wanted to make an appointment with Dr. Lederman, a client can open an eCard address book, select the "L" 21010 in alphabet bar 21005 to have Dr. Lederman's entry 21030 displayed. The eCard 21060 can provide, for example, a calendar displaying available appointment times. The calendar accessed through the eCard 21060 can be updated. The client can wait until a communication channel becomes free, and contact her to book a date and time according to the calendar.

Figure 12:
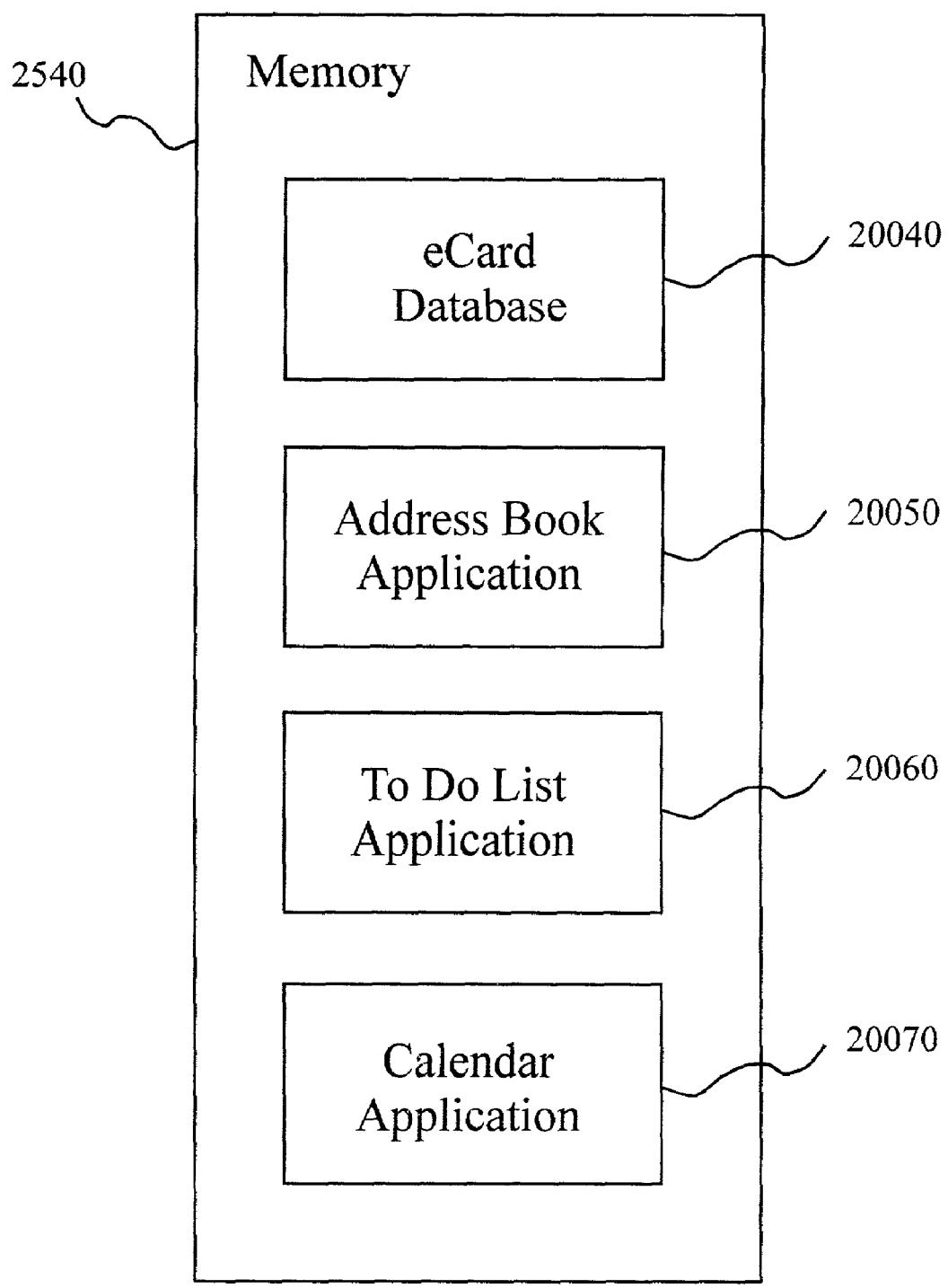
FIG. 12 is a diagram of a node supporting an eCard PIM application according to an embodiment of the present invention.

Similar to the eCard sender and receiver nodes 2040 and 2060, PIM applications can be run from a network-connected node, for example, as depicted in FIG. 2b. FIG. 12 is a component diagram of the memory 2540 of the node. The modules can include an eCard database 20040 and an address book application 20050. The memory 2450 can comprise two Person Information Management (PIM) applications: a To Do List application 20060, and a Calendar application 20070.

The eCard database 20040, provides access to all the eCards the client has sent and received. The eCard database 20040 can be a front end interface that accesses both the user's Sender eCard database 5030 and Received eCard database 7030. The eCard database 20040 can also be the user's single eCard database in the special case where the Sender eCard database 5030 and the Received eCard database 7030 can be the same database.

The Address Book application 20050, can be an application (e.g., one written in Java or C), which is able to access the eCard database 20040 to provide a graphical user interface 21000 of the retrieved information, and provide an HTML rendering of the eCards. Address books, for example, the Lotus Notes® product, can enable the client to attach the URLs of relevant eCards, but may not provide the rendering capability needed to display the dynamically updated eCards in place. Thus, if Lotus Notes® were used, the associated "to" 21070 and "from" 21060 eCards can be displayed in separate web browsers.

Figure 11:
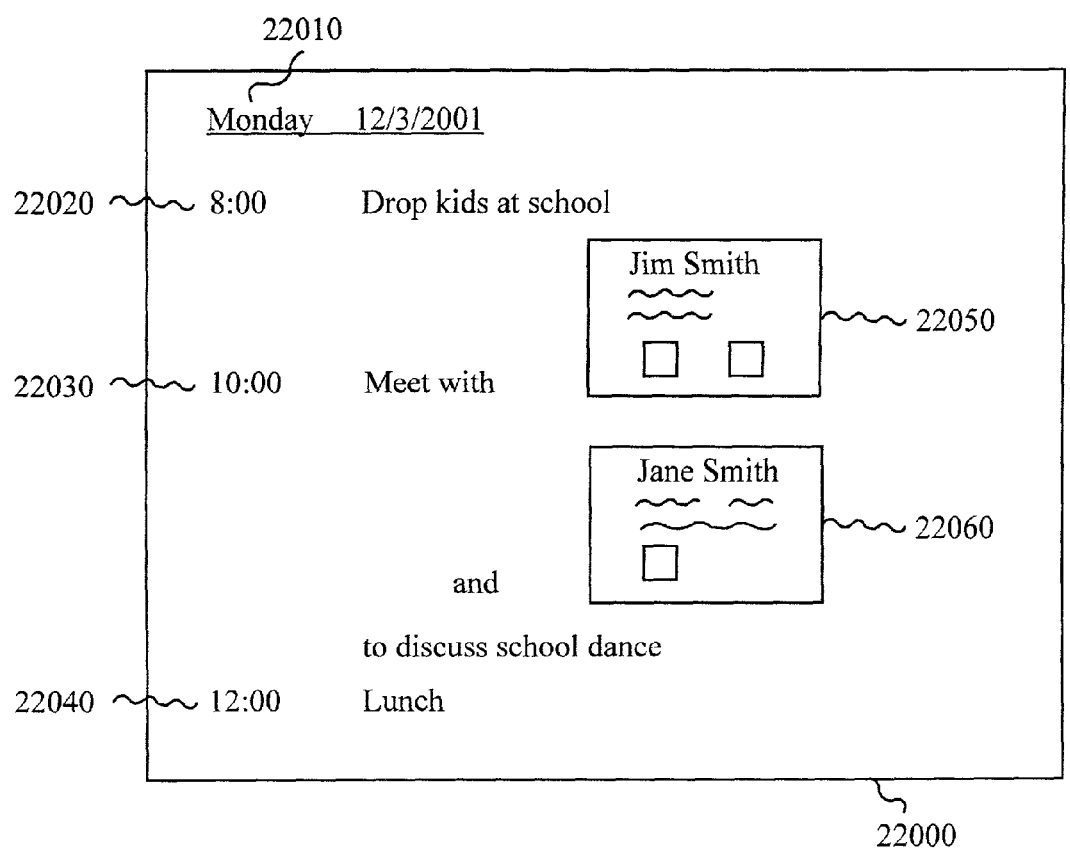
FIG. 11 is an illustrative example of an eCard Calendar according to an embodiment of the present invention.

Similar to the address book PIM application is the online Calendar. FIG. 11 depicts a user interface 22000 to an eCard enabled version of the application. As shown, the displayed entry in the interface 22000 can comprise an indication of the relevant day 22010, as well as three entries 22020, 22030 and 22040, each comprising an indication of the time of the associated event. A second entry 22030, in addition to text describing the event, comprise two eCards 22050 and 22060, for other meetings participants. For example, given a meeting time that has arrived and yet neither of the two other participants has arrived, by looking at this calendar entry, a client can learn where the two participants are, and contact them using the one or more accessible communication channels.

According to an embodiment of the present invention, the Calendar application 20070 that provides this interface 22000 can be, for example, Lotus Notes®.

Figure 10:
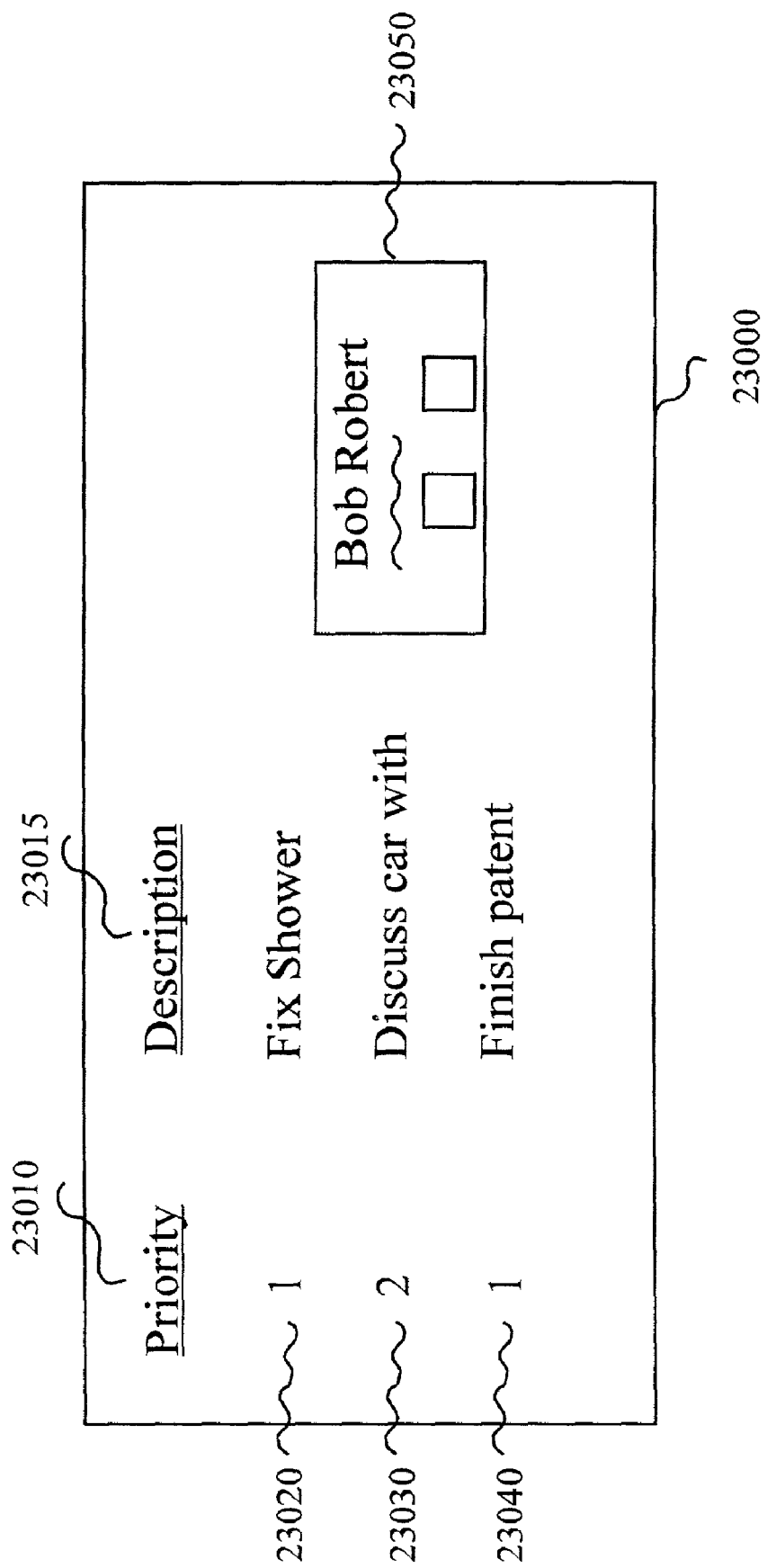
FIG. 10 is an illustrative example of an eCard embedded in a To Do list according to an embodiment of the present invention.

FIG. 10 depicts an example of a user interface to an eCard-enabled To Do List. As shown, the interface 23000 can comprise column headings for Priority 23010 and Description 23015, as well as three entries 23020, 23030 and 23040. In addition to text, the second entry 23030 can comprise an issuing client's eCard 23050. Given the client's eCard 23050 the viewing client can determine whether the issuing client is available to talk, and the available communications channels—including the status of one or more channels.

According to an embodiment of the present invention, the To Do List application 20060 providing the user interface 23000 can be, for example, Lotus Notes®. A PIM application, whose entries include eCards, can sort its entries according one or more values retrieved from the eCards. For example, a To-Do-List including eCards can display its entries sorted according to which of the referenced clients are geographically closer to the first client.

eCard Job Staffing Agent

Another example of an agent that can use the dynamically updated information provided by an eCard is a Job Staffing Agent. The Job Staffing Agent accepts one or more eCards of possible participants—each eCard disclosing the capabilities (e.g., baby sitter, painter, pianist), future availability (e.g., via an online calendar), and one or more communications channels to the corresponding client. In addition, the Job Staffing Agent can take a description of staffing needs, e.g., how many of each of employee type is needed, as well as scheduling parameters, e.g., expected job completion date.

For example, the Job Staffing Agent can schedule and maintain a staff for a construction project in which a general contractor remodels a customer's bathroom, a job that needs to be completed within a given time frame. Since the remodeling includes the replacement of the sink, toilet and shower; installation of new lighting; and the replacement of all of the floor tile, the job will need a plumber, an electrician, and a tile man.

Figure 15:
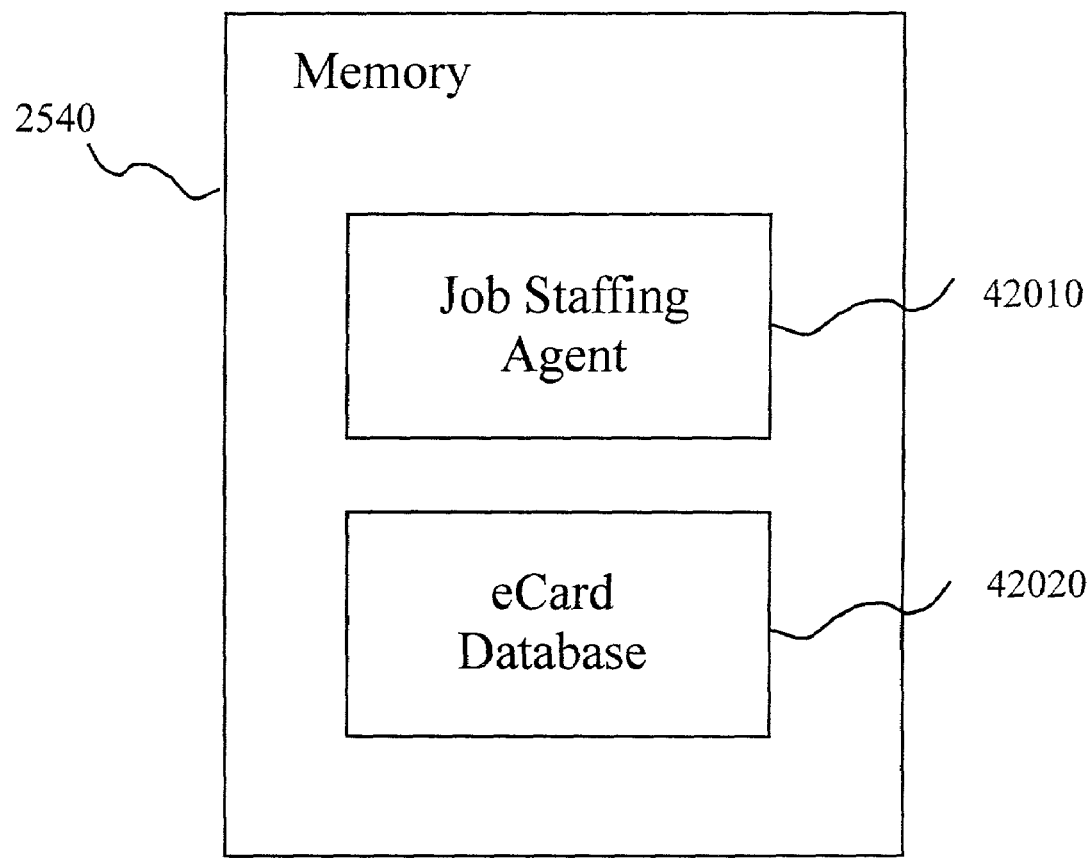
FIG. 15 is a diagram of a memory of a node supporting the Job Staffing Agent according to an embodiment of the present invention.

The Job Staffing Agent application can be run by a given client from a network node, e.g., 2040 or 2060 FIG. 2a, connected to the network 2000. FIG. 15 depicts a memory 2540 of the network node. As shown, the memory 2540 includes the Job Staffing Agent 42010, described with reference to FIG. 16, and the eCard Database 42020.

The eCard database 42020, provides access to all of the eCards that the current client, e.g., the general contractor, has sent and received. The eCard database 42020 can be a front end interface that accesses both the user's Sender eCard database 5030 and Received eCard database 7030. The eCard database 42020 can also be the user's single eCard database in the special case where the Sender eCard database 5030 and the Received eCard database 7030 are one in the same database.

Figure 16:
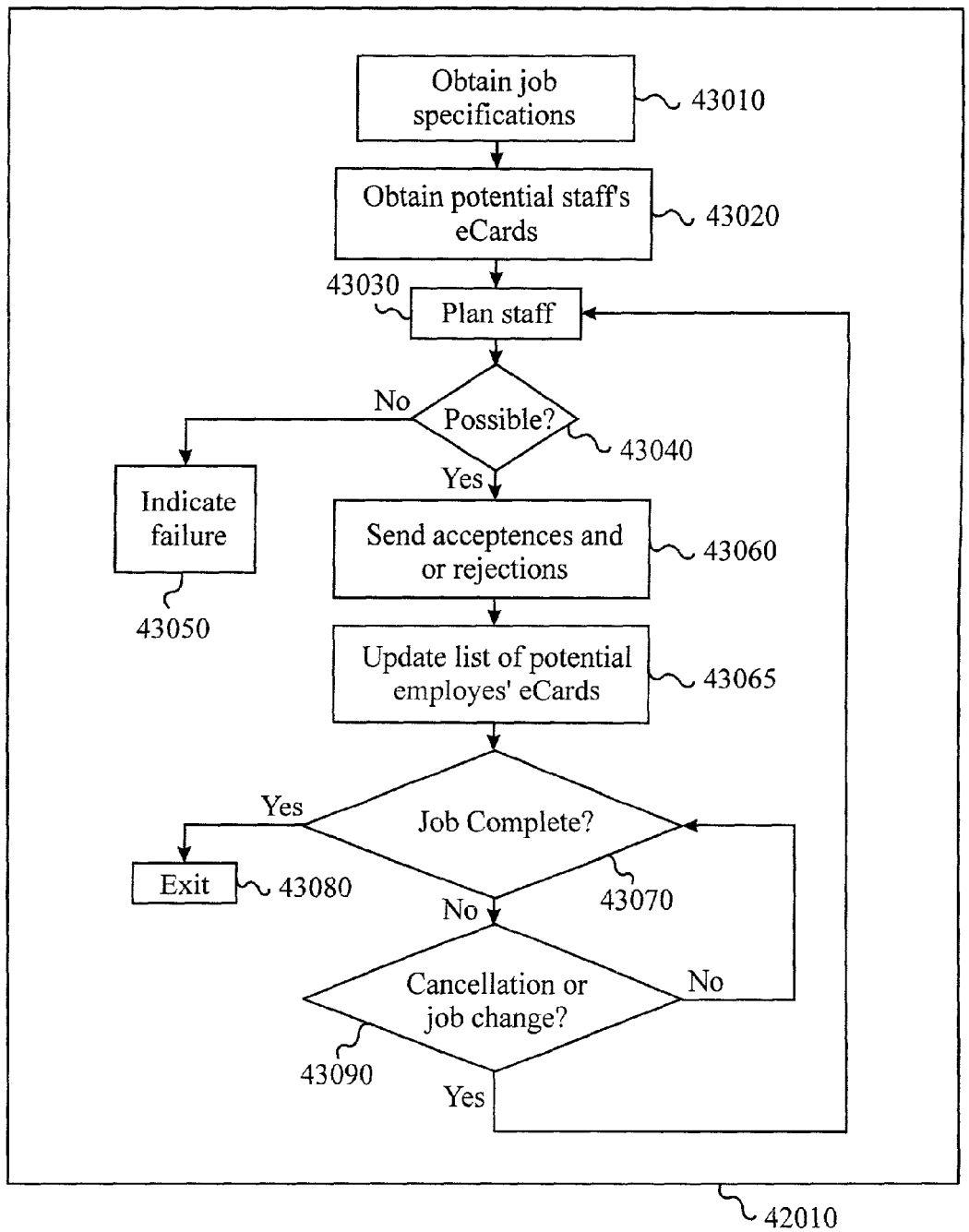
FIG. 16 is a flow chart of a Job Staffing Agent application according to an embodiment of the present invention.

In the preferred embodiment, the Job Staffing Agent 42010, is an application, e.g., one written in Java or C. As shown in FIG. 16, this application 42010 begins in block 43010 by having the contractor provide the specifications of the job it is to handle. For example, what type of skills the workers need, how many of each are needed, and when the job is to start and finish. In block 43020, the contractor passes the application 42010 the eCards of all of the possible employees.

The general contractor can retrieve these eCards from an eCard database 42020, and then pass them to the agent. Alternatively, one with regular skill in the art will appreciate that the contractor can also obtain the eCards of the needed professional by posting an advertisement for the job, e.g., via a web site, describing the job and indicating to interested clients where they should send their eCards. The contractor can specify in the advertisement the minimum information each submitted eCard would need to provide (e.g., skill, availability, and one or more communication channel). Applicant eCards can also provide references, these references specified using the eCard of the each given referrer.

In block 43030, the agent 42010 attempts to determine the staffing for the given job, trying to determine which, if any, of the potential employees can handle the job. The agent 42010 needs to take into account each potential employee's skill or skills, and their prior commitments (accessed via their eCard).

In block 43040, the agent 42010 checks whether it is able to determine any sufficient staffing for the job, and if not, indicates its failure back to the contractor in block 43050.

If the agent 42010 is able to determine staffing for the job, then in block 43060, it notifies all of the potential employees as to whether they have a job or not. Note that this communication can be sent using a communications channel from each potential employee's eCard.

In block, 43065, the application 42010 updates its list of the potential applicants' eCards, deleting the eCard of anyone whose schedule conflicts with the current plan, as well as any that were now on the job.

The application now goes in a loop that maintains the required staffing until the job is complete.

In block 43070, it checks whether the job has already completed, exiting in block 43080 if it has.

Otherwise, in block 43090, the agent 42010 checks whether anyone has quit, or whether the job specification has changed (e.g., whether two plumbers are now needed instead of only one). If not, then control continues at block 43070.

If staff or job change has occurred, then program control continues at block 43030, where the agent 42010, again attempts to staff the job with the potential employees (a list changed from that specified in block 43020).

One with regular skill in the art will appreciate that another example of an application of the Job staffing Agent is one that schedules a baby sitter for a particular date. This agent would take a collection of the eCards of all of the possible sitters, and would take the data, time and duration of the upcoming job.

One with regular skill in the art will also appreciate that a further example is a staffing agent that puts together a band for a particular date. This agent would take a collection of the eCards of all of the possible musicians, as well as the data, time and duration of the prospective job.

eCard Contracts

Contracts can be facilitated between two or more clients and their corresponding eCards.

For example, remodeling a kitchen can be the basis for an eCard contract. The job may include installing a new floor, sink, cabinets, and lighting. The eCard contract enables the participants in a business relationship, for example, customer and general contractor, to disclose appropriate information to each other during the course of their relationship, e.g., the remodeling job.

For example, the customer can to monitor who is working on the job as well as the status of each sub-part, e.g., the floors. A subcontractor can see when the customers pays the general contractor. To provide this level of inter-disclosure, the participants in this job (the customer, the general contractor and the subcontractor) can invoke an eCard contract to formalize—and systematize—the needed disclosures.

The eCards contract application server and service are described with reference to FIGS. 17 to 20. Clients of the contract service can contact and communicate with the server via a user interface program, e.g., written in Java or C, running on a local network node, e.g., 2040 or 2060. The local network node can communicate with the eCard contract service via the network 2000, for example, using TCP/IP. The network node that hosts the eCard Contract application is depicted by the AS (Application Server) node 2055 of FIG. 2a. The AS hardware components are described with reference to FIG. 2b.

Figure 17:
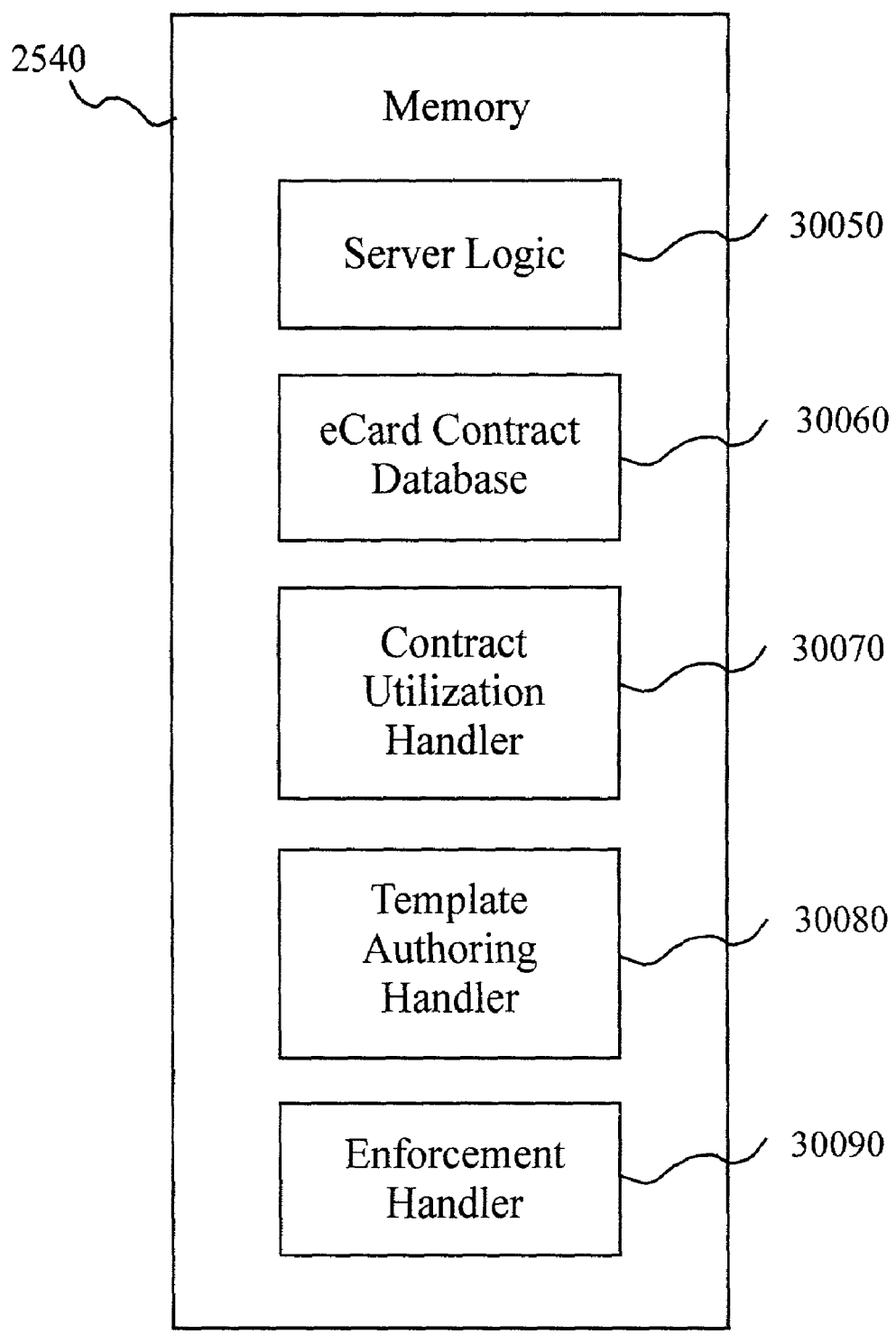
FIG. 17 is a diagram of a memory of a node supporting the eCard Contract Server according to an embodiment of the present invention.

FIG. 17 depicts a memory 2540 of the node 2055. The AS can include the server logic 30050, FIG. 18; the eCard Contract Database 30060, a database including but not limited to IBM's DB2® database product; the Contract Utilization Handler 30070, FIG. 20; the Template Authoring Handler 30080, FIG. 19; and the Enforcement Handler 30090, FIG. 20.

Figure 18:
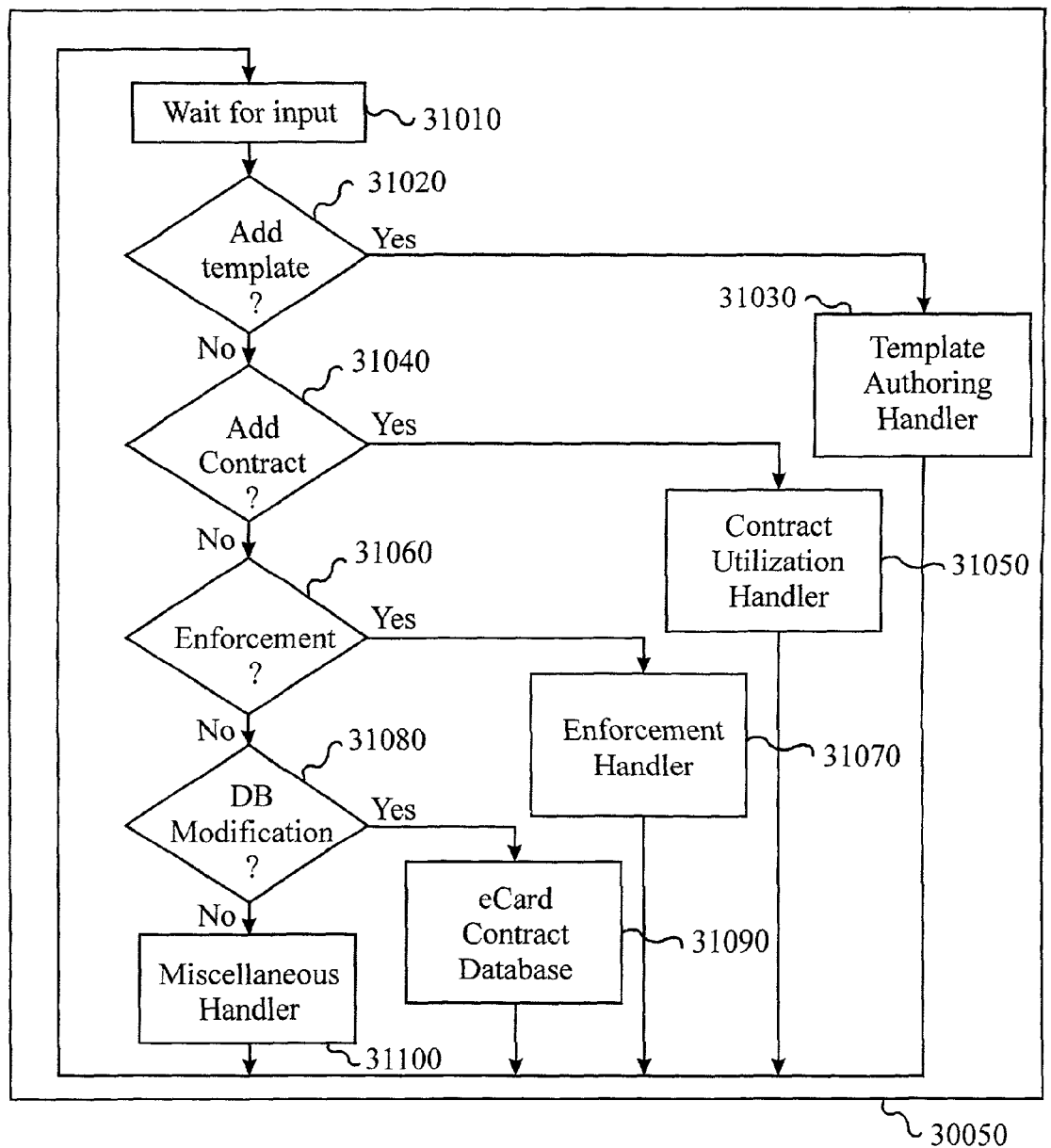
FIG. 18 is a flow chart of an eCard Contract Server's logic according to an embodiment of the present invention.

FIG. 18 depicts the eCard Contract Server's Logic 30050. The server waits for input in block 31010. When received, the server checks the type of the input in block 31020, and, if it is a request to add a contract template, then the Template Authoring Handler 30080 is invoked in block 31030; following which control continues at block 31010. If not, then the input is rechecked in block 31040, and, if it is a request to add a contract, then the Contract Utilization Handler 30070 is invoked in block 31050; following which control continues at block 31010. If not, then the input is rechecked in block 31060, and, if it is data or a request to the Enforcement Handler 30090, then the Enforcement Handler 30090 is invoked in block 31070; following which control continues at block 31010. If not, then the input is rechecked in block 31080, and, if it is data or a request to the eCard Contract Database 30060, then the request is passed on the database 30060 in block 31090; following which control continues at block 31010. Otherwise a miscellaneous handler, beyond the scope of the present invention, is invoked block 31100; following which control continues at block 31010.

Figure 19:
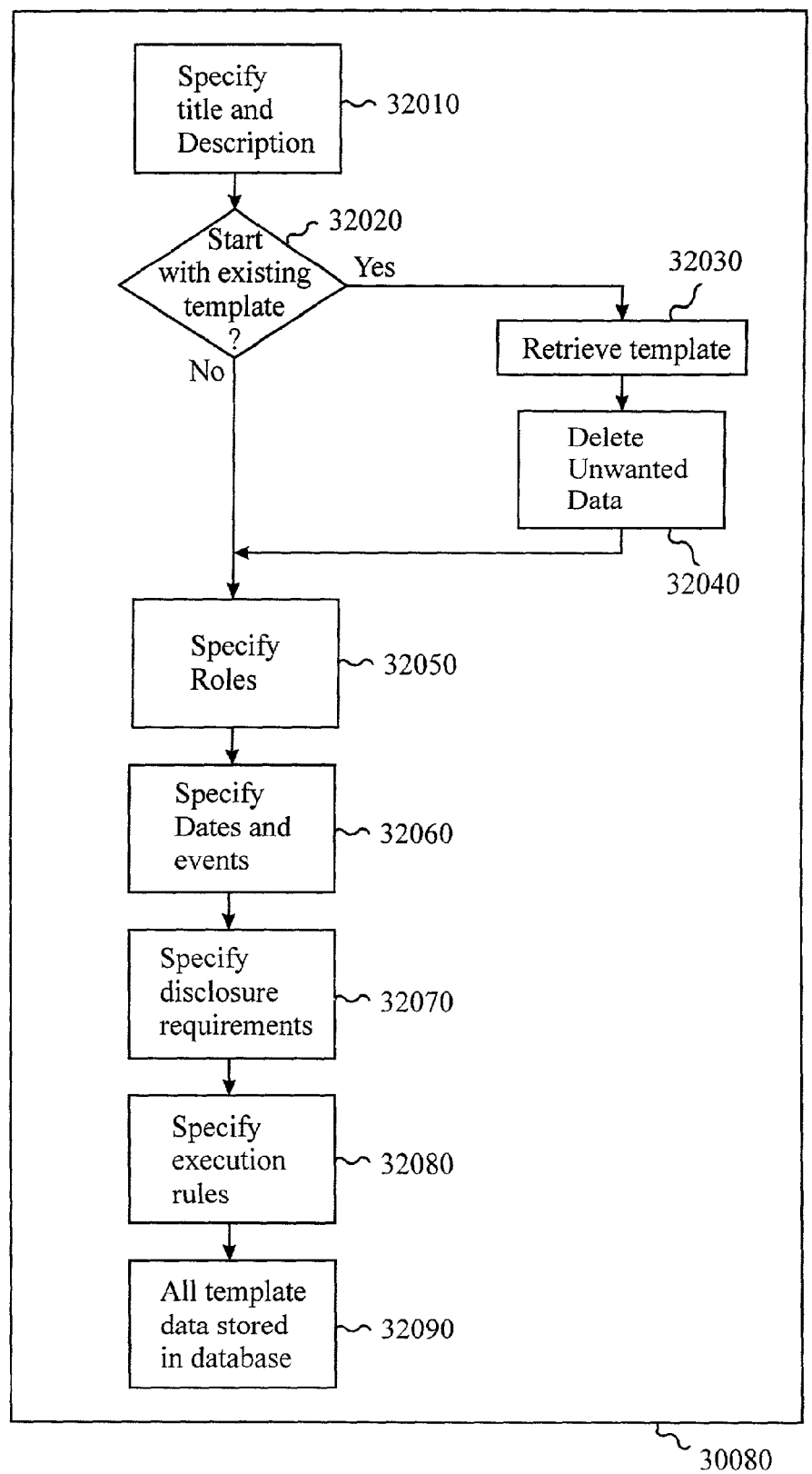
FIG. 19 is a flow chart of a Template Authoring Handler according to an embodiment of the present invention.

FIG. 19 depicts the Template Authoring Handler 30080. An eCard Contract Template allows clients to create and save the fundamentals of an eCard Contract. A client can create another contract in the future based on a contract template. The client can specify the particulars of a new contract. Using the example of the construction project, the customer can set up an eCard Contract for the current job, by recalling the contract template from a previous construction job and then specify the particular of the new job, e.g., the name of the general contractor and those of the subcontractors.

The handler 30080 can request the title and description of the new template in block 32010. The handler determines whether the client wants to start with an existing contract template, e.g., a template of a similar project, such as a wedding client, in block 32020. If so, the requested template is retrieved from the eCard Contract Database in block 32030, and the client is allowed to delete or change and parameters that are no longer appropriate, e.g., deleting the role of caterer, in block 32040. Regardless of whether a previous template was recalled, the client gets to specify any new roles in block 32050. This specification includes an indication of whether or not the given role is required or not, e.g., the role of general contractor is required, while roles of the subcontractors are not, since the whole job can be accomplished by the general contractor alone. In block 32060, the client can specify important dates, e.g., the job needs to be completed by Dec. 25, 2001, and events, e.g., the point at which the customer review the work and accepts everything. In block 32070, the client can specify what particular roles need to disclose—and to whom. This specification includes when the given disclosure is needed, e.g., the customer discloses an acceptance of the work after completion. A type of needed information can be the completion status of the card owner's particular job. This information fed to the Awareness Handler 3040 to be subsequently retrieved and displayed by an eCard 1020. In block 32080, the client can specify any other execution rules, e.g., the general contractor needs to provide availability and contact communications channels to the customer for 1 year after the job is complete (i.e., when the client formally accepts all of the work). Finally, in block 32090, all of the template's data is stored in the eCard Contract Database 30060.

Figure 20:
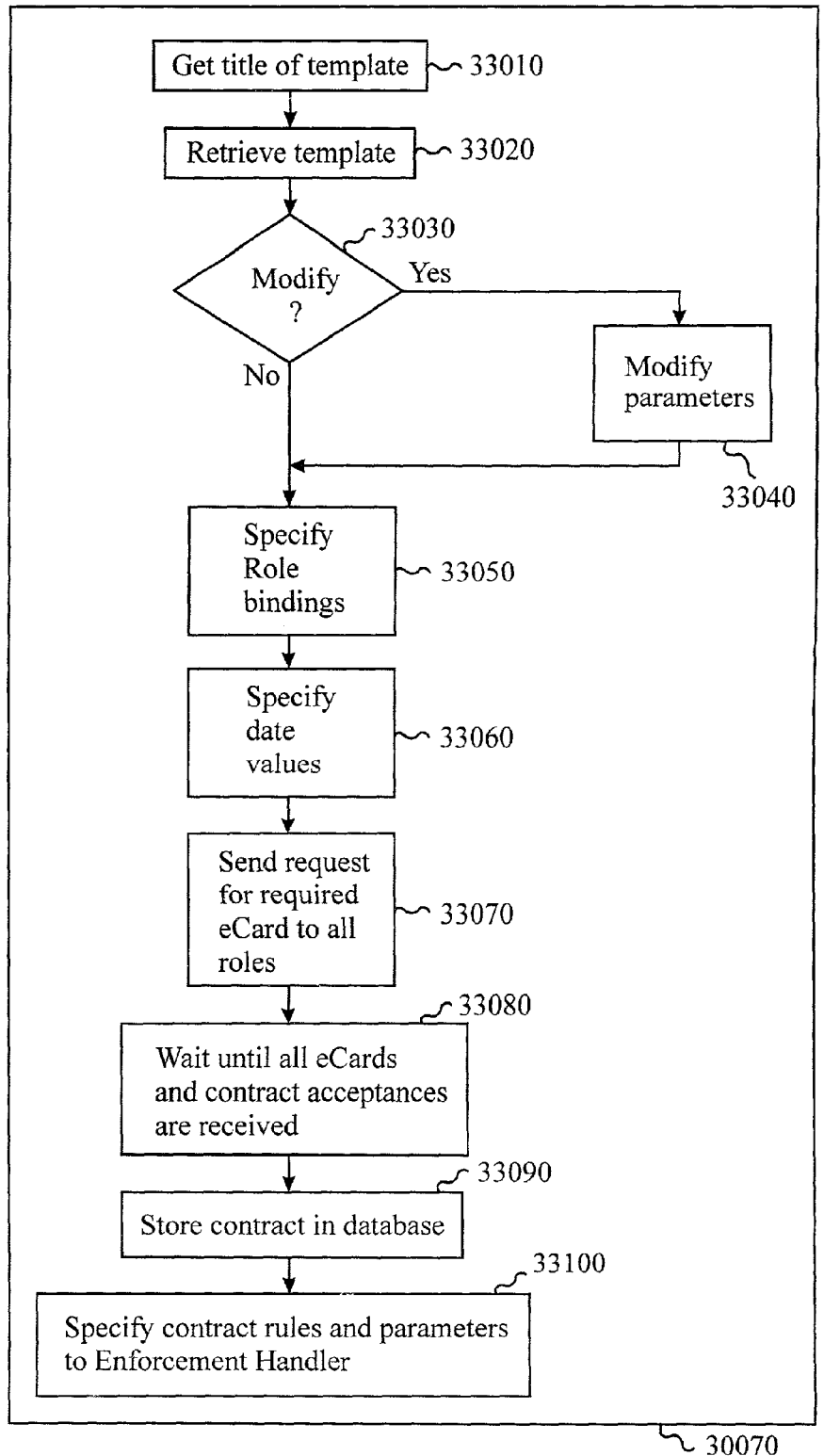
FIG. 20 is a flow chart of a Contract Utilization Handler according to an embodiment of the present invention.

FIG. 20 depicts the eCard Contract Utilization Handler 30070, which allows a client to instantiate a given eCard contract template and then have the contract monitored. As shown, the handler 30070 begins by requesting the title of the desired template in block 33010. The handler 33070 then retrieves the corresponding contract template from the eCard Contract Database 30060 in block 33020. The client is asked whether they want to make any modifications to the template (e.g., adding a role or adding a required disclosure to one of the roles) in block 33030. If so, they are permitted to make any such modifications in block 33040. Regardless of whether any modifications were made, the client specifies the bindings to the templates roles in (e.g., Burt's Roofing will be one of the subcontractors) in block 33050. Note that this block will check that all roles marked required are set before the client moves on to the next block. The client specifies any dates required by the template in block 33060, e.g., the date by which the job absolutely must be completed. A request is sent out, e.g., via e-mail, to all of the participants of the contract in block 33070 in which each recipient is asked to respond with a formal acceptance and with their properly configured eCard. The handler 30070 waits in block 33080 until all such responses are received. Then, in block 33090, all of the new contract's data is stored in the eCard Contract database 30060; following which all of the contract's rules and parameters are passed to the Enforcement Handler 30090 for monitoring.

The Enforcement Handler 30090 is a program, e.g., one written in Java or C, that runs on the application server 2055, that constantly check whether all of the contract rules and conditions it has been passed are being met. For example, the Enforcement Handler 30090 ensures that the eCard from the general contractor discloses all of the needed information to the specified clients when it is supposed to. This handler 30090 sends out notices, e.g., using e-mail, to all of the relevant clients whenever rule violations are detected.

One with regular skill in the art will appreciate that eCard contracts can also be implemented without the use of an Enforcement Handler 30090. In this case, the contract participants monitor themselves, making sure that they and the other participants are all following the rules of the contract to which they all agreed.

The eCard can include additional information, for example, the eCard can be used to indicate why particular pieces of personal information are provided. For example, the eCard from a given subcontractor can indicate that the subcontractor's job completion status information is given to comply with an eCard contract, while a telephone communications icon is provided even to unknown second clients.

Roles Agent

An eCard can represent a role, for example, a doctor on call or a local government. The role can be automatically bound to whichever client is currently fulfilling the role, where the client has an electronic profile accessible by one or more eCards. A client can be automatic bound by according to the electronic profile. For example, by determining from the electronic profile that a doctor is in a hospital and that the doctors calendar indicates that the doctor is scheduled to be at work, the doctor can be automatically designated as the doctor on call, thus binding patient eCards to the doctor's profile. The eCard can provide a patient with, for example, communications capability, e.g., one click telephone contact, and availability information, e.g., the doctor's booking calendar and the doctor's current level of availability, e.g., whether it would be worthwhile to visit the doctor at a particular time.

This same process can be used to provide an eCard representing, for example, Help Desk staff or sales staff. In each case, user's would employ a single eCard to access the client currently handling a particular role.

According to an embodiment of the present invention, a role enables relationships to be long lasting, for example, as the relationship between a local government and a community.

eCard Deactivation Agent

The eCard can represent a relationship between two or more clients. The eCard can automatically deactivate access rights. For example, after a predefined time period, or upon the completion of a contract, the eCard can remove rights to personal information as defined by the Central Access Rights Handler 3070. An eCard Deactivation agent can be provided to monitor the relationship and perform the deactivation. The agent can take as arguments an eCard, the ID of a particular second party and a condition, or set of conditions under which all access rights to the given eCard by the given second party are deleted. For example, a professor can create eCards for each of her students, each including a communications icon to a private chat service. She would then pass each eCard along with the ID of the corresponding student to the eCard Deactivation Agent, specifying the last day of class as the date of deactivation. Thus, when the class ends, each student's eCard can be deactivated. Thus, the professor can offer the private chat area to a next class without interference from the previous class.

Having described embodiments for peer-to-peer interaction and more particularly to a method for flexibly relating information, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for providing access to an electronic profile of a first client to a second client comprising the steps of:
   creating a network accessible electronic profile of the first client, wherein the electronic profile is accessible by an active object, wherein the active object is bound to the electronic profile;
   defining an access right of the second client, wherein the access right determines a portion of the electronic profile accessible to the second client via the active object;
   verifying an identity of the second client; and
   providing access to the portion electronic profile to the second client via the active object, wherein the active object is transferred to the second client from the first client.

2. The method of claim 1, further comprising the step of defining a second access right of a third client wherein the access right determines a portion of the electronic profile available to the third client via the active object.

3. The method of claim 1, wherein the active object is a network accessible active object.

4. The method of claim 1, wherein electronic profile comprises location information of the first client.

5. The method of claim 1, wherein electronic profile comprises status information of the first client.

6. The method of claim 1, wherein electronic profile comprises a communication channel of the first client.

7. The method of claim 1, wherein the step of defining the access right further comprises the step of defining the access right according to a predefined access right specifying a portion of the electronic profile accessible to the second client.

8. The method of claim 7, wherein the electronic profile is associated with one or more clients.

9. The method of claim 1, further comprising the step of limiting the portion of the electronic profile provided by the active object according to a preference of the second client.

10. The method of claim 1, wherein the active object enables the second client to contact the first client.

11. The method of claim 1, further comprising the steps:
    specifying, in the electronic profile, a communication channel of the first client accessible to the second client; and
    establishing the communication channel between the first client and the second client upon selecting the communication channel, wherein the active object comprises means for selecting the communication channel.

12. The method of claim 1, wherein the electronic profile notifies the first client upon an access of the electronic profile.

13. The method of claim 1, wherein at least one of the first client and the second client is a role satisfied by one or more users.

14. The method of claim 1, further comprising the step of specifying means for transacting funds.

15. The method of claim 14, wherein the means for transacting funds is specified in the electronic profile.

16. The method of claim 14, further comprising the step of charging a fee for transacting funds between the first client and the second client.

17. The method of claim 14, wherein the means for transacting funds dynamically determines one of a source and a destination of funds of the first client according to a property of the transaction.

18. The method of claim 1, further comprising the step of authenticated the electronic profile.

19. The method of claim 1, further comprising the step of authenticating information disclosed by the electronic profile.

20. The method of claim 1, further comprising the step of automatically modifying the access right of the second client according to a variable defined in the electronic profile.

21. The method of claim 1, wherein the access right changes over time as a function of a relationship between the first party and the second party.

22. A program storage device readable by a storage network node, tangibly embodying a program of instructions executable by the machine to perform method steps for providing access to an electronic profile of a first client to a second client, the method comprising the steps of:
    storing a network accessible electronic profile of the first client, wherein the electronic profile is accessible by an active object, wherein the active object is bound to the electronic profile;
    storing an access right of the second client, wherein the access right determines a portion of the electronic profile accessible to the second client via the active object;
    verifying an identity of the second client; and
    providing access to the portion electronic profile to the second client via the active object, wherein the active object is transferred to the second client from the first client, and wherein the second client is network nodes coupled to the storage network node via a network.

23. The method of claim 1, further comprising the steps of:
    storing a contract template, wherein the contract template comprises a plurality of roles and a plurality of access rights, wherein each role is associated with at least one access right;
    staffing each role with one of the first client and the second client, wherein the first client and the second client each provide access to corresponding electronic profiles accessible by corresponding active objects; and
    assigning access rights to the first client and second client according to the contract template and the active objects.

* * * * *